United States Patent
Dziabiak et al.

(10) Patent No.: US 11,544,793 B2
(45) Date of Patent: Jan. 3, 2023

(54) DIMENSIONALITY REDUCTION OF MULTI-ATTRIBUTE CONSUMER PROFILES

(71) Applicant: Insurance Zebra Inc., Austin, TX (US)

(72) Inventors: Joshua Dziabiak, Austin, TX (US);
Adam Lyons, Austin, TX (US);
Meetesh Karia, Austin, TX (US);
Matthew Stephens, Austin, TX (US);
Omri Buzi, Austin, TX (US)

( * ) Notice: Subject to any disclaimer, the term of this patent is extended or adjusted under 35 U.S.C. 154(b) by 199 days.

(21) Appl. No.: 16/999,895

(22) Filed: Aug. 21, 2020

(65) Prior Publication Data

US 2021/0035232 A1 Feb. 4, 2021

Related U.S. Application Data

(63) Continuation of application No. 15/922,412, filed on Mar. 15, 2018, now Pat. No. 10,789,652, which is a continuation of application No. 15/601,584, filed on May 22, 2017, now Pat. No. 9,953,372.

(51) Int. Cl.
*G06Q 40/08* (2012.01)
*G06Q 30/02* (2012.01)

(52) U.S. Cl.
CPC .......... *G06Q 40/08* (2013.01); *G06Q 30/02* (2013.01)

(58) Field of Classification Search
CPC ............................. G06Q 40/08; G06Q 30/02
USPC ...................................................... 705/3–44
See application file for complete search history.

(56) References Cited

U.S. PATENT DOCUMENTS

| | | | |
|---|---|---|---|
| 6,738,077 B1 * | 5/2004 | Wendker | G06F 16/252 715/744 |
| 9,342,541 B1 * | 5/2016 | Malireddy | G06Q 10/0639 |
| 10,037,331 B2 * | 7/2018 | Munk | G06F 16/168 |
| 10,860,163 B1 * | 12/2020 | Brocato | H04L 41/22 |
| 11,153,235 B1 * | 10/2021 | Dalonzo | H04L 51/04 |
| 11,301,538 B1 * | 4/2022 | Zanni | G06F 9/451 |
| 2012/0096072 A1 * | 4/2012 | So | G06F 9/542 709/203 |
| 2012/0296840 A1 * | 11/2012 | Vogel | G06Q 30/0283 705/342 |
| 2013/0080911 A1 * | 3/2013 | Klemm | G06F 16/958 715/745 |
| 2013/0305182 A1 * | 11/2013 | Marseille | G06Q 50/14 715/780 |
| 2018/0089561 A1 * | 3/2018 | Oliner | G06F 16/26 |

FOREIGN PATENT DOCUMENTS

| | | | | |
|---|---|---|---|---|
| AU | 2015255328 B2 * | 8/2017 | ......... | G06F 16/9537 |
| WO | WO-2020226663 A1 * | 11/2020 | ......... | G06F 16/2425 |

* cited by examiner

*Primary Examiner* — Frantzy Poinvil
(74) *Attorney, Agent, or Firm* — Pillsbury Winthrop Shaw Pittman, LLP; Joshua L. Tucker

(57) ABSTRACT

Provided is a process of inferring insurability scores, the process including: receiving a request for an insurance comparison webpage; sending instructions to present one or more webpages of a web site having a plurality of user inputs configured to receive a plurality of attributes of the user; receiving the attributes; determining an insurability score with an insurability model based on the received attributes of the user; and sending instructions to display a value indicative of the insurability score.

38 Claims, 12 Drawing Sheets

DIMENSIONALITY REDUCTION OF MULTI-ATTRIBUTE CONSUMER PROFILES

CROSS-REFERENCE TO RELATED APPLICATIONS

The present patent is a continuation of U.S. patent application Ser. No. 15/922,412 filed 15 Mar. 2018, which is a continuation of U.S. patent application Ser. No. 15/601,584, filed 22 May 2017, both applications having the same title. The entire content of each application is hereby incorporated by reference.

BACKGROUND

Field

The present disclosure relates generally to computer-implemented insurance comparison applications and, more specifically, to insurance comparison applications configured to inform consumers of their insurability by reducing dimensionality of attributes in their profiles that affect insurance pricing.

Description of the Related Art

Insurance, as a product, is particularly complex. There are a variety of different types of insurance, for example, homeowner's insurance, automotive insurance, professional liability insurance, flood insurance, business continuity insurance, and the like. Within each type of insurance, often there are a variety of different types of insurance policies, often reflecting different sets of scenarios that are covered and different amounts of compensation in the event of those scenarios. Other factors often including deductibles, whether a policy provides liability or comprehensive coverage, whether a policy provides replacement value or non-replacement value compensation, and premiums for the policy. This complexity is compounded by different insurance providers offering differing terms for similar policies.

Different consumer (also referred to as users) attributes add further complexity. For each of these types of insurance policies, there are often a relatively large number of factors that affect pricing specific to the consumer for a given policy, typically indicative of the consumer's risk of seeking compensation under the policy (and in some cases, sensitivity to price). For example, price of a given insurance policy may depend upon 10 or more different attributes of the consumer, and in many cases substantially more attributes of consumers. Further complexity arises from differing pricing based on these user attributes by competing insurance providers (e.g., carriers or brokers), often each providing different pricing for different sets of consumer attributes in each of the different permutations of insurance above, in many cases, with the basis for prices being opaque and confusing for consumers.

Insurance, from the perspective of the consumer, suffers from a phenomenon referred to as the curse of dimensionality. This is an open problem in the field of computer science that arises where a selection is to be made among a large number of candidates based upon a large number of factors that combine factorially. In many cases, these types of problems tend to scale poorly with the number of items considered or the number of factors upon which decisions are made. As a result, computer systems often struggle with more complex use cases, which in the field of insurance and related products, are often more closely aligned with real-world scenarios.

These problems are often particularly apparent in existing insurance comparison software applications for consumers. Often, these software applications fail to adequately distill information about the universe of insurance products down to a relatively low dimensional output that is useful for consumers. Generally, existing systems support the evaluation of various scenarios by which consumers navigate through several dimensions related to the insurance products, but these systems often fail to provide a sufficiently low dimensional characterization of the universe of insurance products that is actionable and relevant to the consumer seeking to understand why they are offered the prices they observe, what product is best given their attributes, or how they can change their attributes to receive better pricing.

SUMMARY

The following is a non-exhaustive listing of some aspects of the present techniques. These and other aspects are described in the following disclosure.

Some aspects include a process to infer insurability scores of user, the process including: receiving, with a web server, from a user computing device, via a network, a request for an insurance comparison webpage; after receiving the request, sending, to the user computing device, instructions to present one or more webpages of a website having a plurality of user inputs configured to receive a plurality of attributes of the user; receiving, with a server, from the user computing device, the attributes of the user upon entry of the attributes into the user inputs of the website; determining, with one or more processors, an insurability score with an insurability model based on the received attributes of the user, the insurability model having an output dimension of insurability score and four or more input dimensions of insurance consumer attributes; and sending, with a server, to the user computing device, instructions to display a value indicative of the insurability score, wherein the insurability score is an aggregate estimate of insurance risk that consolidates the four or more input dimensions into a single output dimension.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
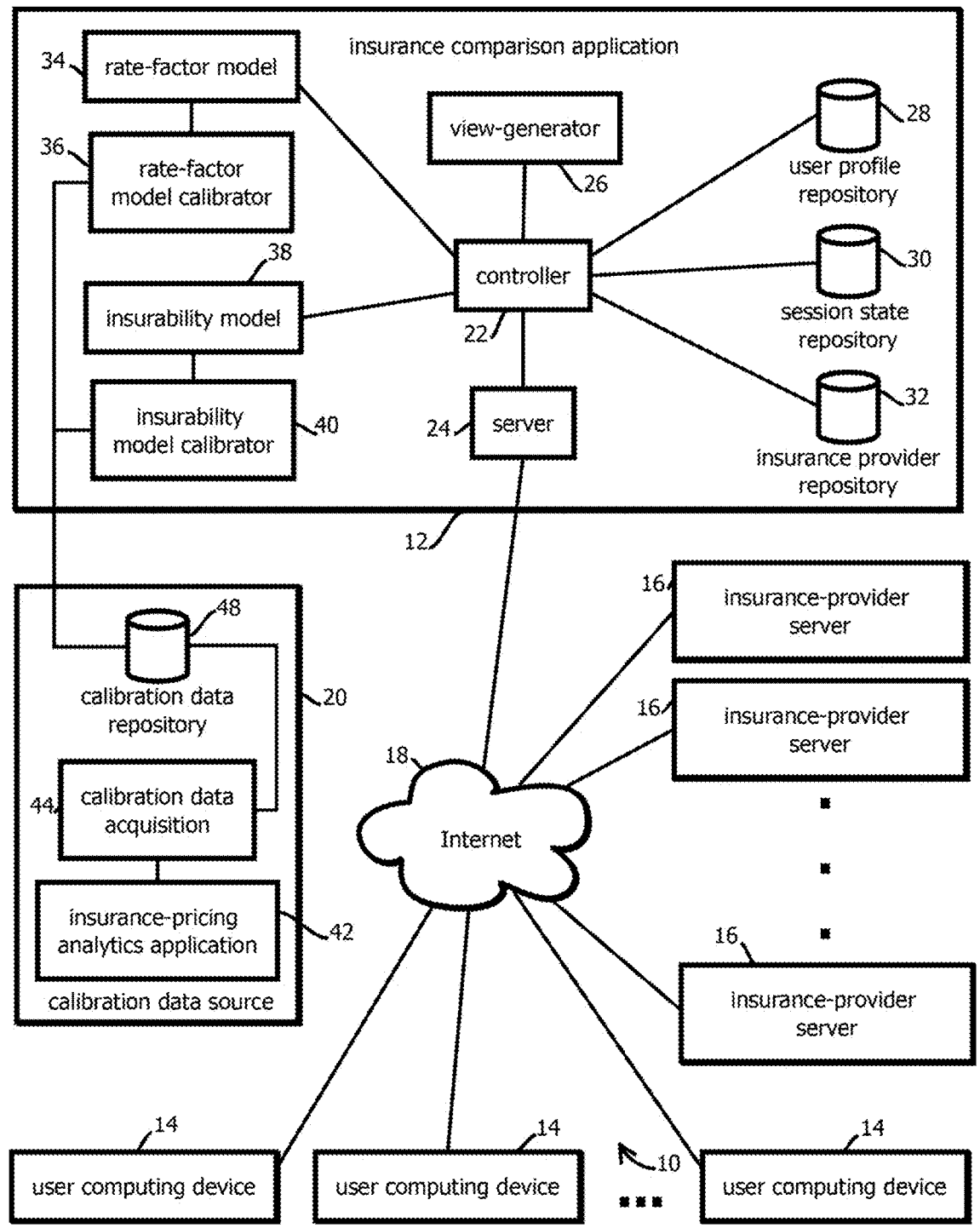
FIG. 1 is a logical and physical architecture block diagram of an example of a computing environment including an insurance comparison application in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of human-computer interaction and data analytics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Several independently useful inventions are described below. These inventions may be used synergistically together, but it should be emphasized that they need not be combined. In other words, the claims should not be read to require that each invention described in this patent be present, as the claims may focus on only one or a combination of a subset of the inventive techniques described herein. Indeed, the inventors expect to file several versions of this disclosure in different patents to target different aspects of the described subject matter.

Some embodiments use an algorithm to formulate an aggregate (e.g., a single value based on many values) score for a given consumer's key attributes, assessing and providing a simple measure of risk as it relates to an insurance provider's potential willingness to underwrite a consumer. In some embodiments, attributes considered include a consumer's gender, marital status, age, driving history (e.g., a weighted score based on number and type of past violations, accidents, tickets, and claims within a trailing duration of time), assumed (or actual) credit rating, current insurance status, home ownership status, and annual miles driven (e.g., as estimated or reported by the user). The score is referred to as an insurability score.

Once the consumer's score is formulated, some embodiments compare their score against the average score for similar consumer's in their location, e.g., based off of the originating consumer's zip code. The originating consumer's score, along with the local average score, may then be plotted and displayed on a gauge for visual aide. In some embodiments, the higher the score, the better the risk—the lower the score, the higher the risk. Each score, in some embodiments, may belong to a specific ordinal category based upon falling in a corresponding range (e.g., "Very Poor," "Poor," "Fair," "Good," "Very Good," or "Excellent") that helps to provide context for the consumer. In some embodiments, the consumer may expand on their score to learn which factors are either positively or negatively impacting their score, which may include highlighting those factors having the largest effect. Each factor (also referred to as an attribute or parameter), in some embodiments, may be accompanied by a description or tips to help the consumer improve their score over time. While many factors typically impact the consumer's premiums (or other types of insurance price), in some embodiments, the insurability score is not necessarily a direct indicator of pricing and, in some cases, is an aggregate inference of risk as perceived by a collection of insurance providers. In some cases, the insurability score may not be based on certain factors that affect insurance price, such as vehicle attributes or geolocation.

In some embodiments, these and other techniques described below may be implemented in a computing environment 10 shown in FIG. 1. In some embodiments, the computing environment 10 may include an insurance comparison application 12 configured to help consumers compare different insurance products, for instance, from different providers of automotive insurance. In some embodiments, the insurance comparison application 12 may be configured to determine an insurability score for a user like that described above, for instance, using a process described below with reference to FIG. 3. In some embodiments, the determination of the insurability score may be based upon a model that is calibrated with the process described below with reference to FIG. 2, and in some cases the insurability score may be presented in a user interface like that described below with reference to FIG. 4, for instance, in a website including the user interface shown in FIG. 11.

In some embodiments, the computing environment 10 further includes a plurality of user computing devices 14 upon which user interfaces are presented through interaction with the insurance comparison application 12. The computing environment 10 may further include insurance provider servers 16 that may host content by which users may learn more about insurance policies or purchase insurance policies. Users may be directed to the insurance provider servers 16 via a user interface sent to a user computing device 14 by the insurance comparison application 12, such as through a hyperlink.

In some embodiments, these components may communicate with one another via the Internet 18 and various other networks, such as local area networks, wireless area networks, cellular networks, and the like.

In some embodiments, the insurance comparison application 12 may be characterized as a distributed application having both code executing on the user computing devices 14, for instance, in the form of webpage markup and related scripts executing within a browser, or in the form of a native mobile application, and code executing server-side, for instance, in a data center, remote from the user computing devices 14. In some embodiments, the insurance comparison application 12 may be implemented on a plurality of computing devices, for instance, in different virtual machines or containers within a data center hosting environment. In some embodiments, the different components of the insurance comparison application 12 may be executed on different or the same computational entities, like computing devices, virtual machines, or containers, for instance in a data center (e.g., having networked instances of computing devices like those described with reference to FIG. 12), in some cases with different components being replicated behind load balancers to facilitate operations at commercially relevant scales.

In some embodiments, each of the user computing devices 14 may be operated by a different user accessing the insurance comparison application 12. Three user computing devices 14 are shown, but commercial embodiments are expected to interface with substantially more, for instance, more than 1000, more than 10,000, or more than 1 million user computing devices, for instance, within a year, day, hour, or concurrently. In some embodiments, the user computing devices 14 may be geographically distributed over a relatively large area, such as the United States, an entire continent, or the entire world. To accommodate these scales, some embodiments may interface with content distribution systems by which content used in presenting the interfaces described below is geographically position closer to user computing devices, and user computing devices or sent instructions to retrieve those assets from the corresponding content distribution system location determined to be lower latency than the others. In some embodiments, each of the user computing devices 14 may be one of the computers described below with reference to FIG. 12. In some embodiments, the user computing devices 14 may be desktop computers, laptop computers, tablet computers, smart phones, in-store kiosks, set-top boxes, gaming consoles, wearable computing devices, or the like. In some embodiments, the user computing devices 14 may execute an operating system and a web browser or native application within an operating system that interfaces with the insurance comparison application 12.

In some embodiments, the insurance provider servers 16 may host websites of different insurance providers, such as insurers, insurance brokers, or the like. In some embodiments, these servers may be web servers at Internet Protocol addresses associated with uniform resource locators (URLs) of the respective insurance providers by a domain name service (DNS). In some embodiments, these URLs may be supplied by the insurance comparison application 12 to user computing devices 14, so that users of the computing devices 14 may relatively easily navigate to insurance provider websites after viewing a user interface with a report by which the user can comparison shop (e.g., like that shown in FIG. 11).

In some embodiments, the insurance comparison application 12 may further be configured to communicate attributes of the user to the insurance-provider servers, for example, as a serialized string of keyvalue pairs in a query string appended to the end of the URLs, such that when a user selects one of those URLs, the query string is conveyed to the insurance-provider website via the user computing device 14, and the insurance provider server 16 may prepopulate various forms for the user to ease the onboarding process based on information supplied to the insurance comparison application 12. Or in some cases, the insurance providers may host application program interface servers by which the insurance comparison application 12 may communicate such information directly to the insurance providers. Or in some embodiments, users may reenter their information upon navigating to the insurance provider servers, and in some cases, an insurance provider may receive this information, send a quote, receive acceptance of the quote, and provide insurance to the user upon receiving payment of premiums.

It should be emphasized that the present techniques are improvements to computer system functionality and are not directed to improvements in, for instance, insurance contracts or other financial products. The present techniques address problems that arise in the context of relatively high dimensional product configurations with relatively bespoke pricing, for which existing computer systems are not particularly well-suited for consumers. Simply because the data, in some embodiments, happens to represent information relevant to insurance does not make this application directed to insurance contracts or other financial products. Indeed, while the examples herein are described with reference to scenarios in which the data represents information related to automotive insurance, the present techniques are applicable in a wide variety of other use cases, for instance, when the data represents information about other types of products exhibiting similar phenomena, such as college education, healthcare, air travel, credit scores, lending, and the like. In other examples, the insurance comparison application (and related techniques below) may assist users with comparing different types of property and causality insurance (including bundles of the same), such as automotive, home, renter's, motorcycle, boat, or recreational vehicle insurance, and the like, or various other types of insurance, like heath, life, etc. Indeed, some of the techniques herein generally relate to human-computer interaction data visualization problems where the data set is particularly complex relative to the user's cognitive budget and expertise in data science.

In some embodiments, the insurance comparison application 12 obtains calibration data from a calibration data source 20 to calibrate the various models described below. In some embodiments, this calibrations data source 20 may be hosted within the same data center as the insurance comparison application 12 or may be remote from the insurance comparison application 12. In some embodiments, the insurance comparison application 12 may be characterized as including the calibration data source 20, or in some cases, models may be pre-calibrated, which is not to suggest that any other feature described herein is not also amenable to variation in different embodiments or is otherwise limited to the described arrangement.

In some embodiments, the insurance comparison application 12 includes a controller 22, a server 24, a review generator 26, a user profile repository 28, a session state repository 30, an insurance provider repository 32, a rate-factor model 34, a rate-factor model calibrator 36, an insurability model 38, and an insurability model calibrator 40. In some embodiments, the controller 22 may coordinate the operation of these other components and direct the other components to execute routines like those described below with reference to FIGS. 2 through 11, including directing the other components to send instructions to user computing devices 14 to present user interfaces described below.

In some embodiments, the server 24 is a nonblocking web server, for instance, configured to implement deferreds or promises, by which a relatively large number of concurrent sessions with user computing devices 14 are supported by relatively quickly handing off an incoming request to another process to handle the request asynchronously. In some embodiments, a plurality of servers 24 or other instances of the other described modules may be implemented behind a load balancer as replicated instances of the modules. In some embodiments, communications may be routed to the appropriate instance based upon a hash value of a session identifier in communications from (or to) the user computing devices 14. In some embodiments, each user interface sent to a user computing devices 14 may include a unique session identifier, such as an increment count, and the user computing devices 14 may send back that session identifier paired with other communications from the user computing devices 14 (e.g., GET or POST requests), such that those other communications may be consistently routed to the same replicated instance to provide a consistent experience throughout a session while concurrently processing a relatively large number of sessions through replicated instances handling different sessions. Or in some embodiments, the entire insurance comparison application 12 may be hosted on a single computing device in a single computing environment, such as an operating system, virtual machine, or container, which is not to suggest that other described items may not also be varied in some embodiments.

In some embodiments, the view generator 26 may be configured to dynamically generate instructions by which the user interfaces described herein are presented on user computing devices 14. In some embodiments, the view generator 26 may include a plurality of templates, such as templates indicating how to construct markup instructions and scripts, such as JavaScript™ or web assembly by which user interfaces, such as webpages or user interfaces in a native application are formed. In some cases, the instructions may take the form of commands, or in some cases the instructions may take the form of data sent to existing code on the user computing device 14 that causes the user computing device 14 to form a user interface based upon the sent data, such as a JavaScript™ object notation (JSON) or extensible markup language (XML) object sent to the user computing device 14. In some embodiments, the view generator 26 may construct webpage markup that references various assets, like images, scripts, webpage analytics tools, content delivery network hosts, and the like. In some cases, the user interfaces may evolve based upon updated data or command sent to the user computing devices 14. For instance, a plurality of user inputs may be presented within a given user interface by changing which user input is displayed within the user interface sequentially after each user input is displayed and receives a value, or in some cases, different user interfaces may be sent to obtain different user inputs, or in some cases a plurality of user inputs may be sent and displayed concurrently.

Various data repositories are shown. These repositories may take a variety of different forms, including relational databases, such as those in third normal form having a plurality of indexes by which retrieval of records may be accelerated. Further, such databases may include various noSQL databases, such as graph databases, document databases, and keyvalue stores by which the records described may be stored and retrieved with relatively flexible schemas. In some embodiments, the records of the databases may be indexed by a plurality of different fields of the records, such that records may be retrieved relatively quickly by specifying the indexed field's value. Further, in some cases, the records may be sorted to facilitate relatively fast searches, such as with a binary search. In some cases, records may be sharded or stored in in horizontal partitions to facilitate operation at larger scales. In some cases, some of the records, such as those accessed within a threshold duration of trailing time, may be replicated in a cache data store, such as a cache data store in random-access memory or a solid-state drive, and some embodiments may access the cached value for relatively fast retrieval, while eventually updating the slower primary version of the data, in some cases maintaining inconsistent data across the two versions of the record for some amount of time.

In some embodiments, the user profile repository 28 may store a plurality of user profile records, each user profile record including an identifier of a user, which may be an anonymized identifier, and a plurality of attributes of the user. In some cases, the attributes include attributes of the user's computing device by which the user may be detected in subsequent sessions and by which the other information the user profile may be retrieved and used to pre-populate user interfaces by the view generator 26. In some embodiments, the user profile repository includes user records that have a plurality of attributes of the user by which insurance products may be selected, recommended, quoted, or the like. In some cases, these records may be stored client-side, for instance in a cookie, browser program state, a localStorage object, or a SQLite database of a user's browser. In some cases, each record for a user may include a plurality of fields corresponding to different attributes, including three, five, seven, ten, or more of the following:

- a value indicative of current insurance status sufficient to indicate whether a person is insured or not insured;
- age of a person;
- a value indicative of previous traffic incidents or violations of driving laws by a person
- a category of vehicle use (e.g., commercial or non-commercial);
- a number of vehicles or number of drivers;
- a value indicative of marital status of a person;
- a value indicative of credit score of a person;
- a value indicative of whether a residence is owned by a person;
- a value indicative of whether a certificate of insurance is required;
- a value indicative of whether home insurance is also being acquired;
- a value indicative of whether a vehicle is owned by a person;
- a value indicative of annual mileage of a vehicle driven by a person;
- a value indicative of gender of a person; and a value indicative of an amount of education obtained by a person.

In some embodiments, some of these values may be null values indicating that the user has not yet supplied a value, e.g., in partially entered profiles.

In some embodiments, the session state repository 30 may store information about ongoing or previous sessions with user computing devices 14. In some cases, the session state data may include website analytics, unique session identifiers, and mappings to records in the user profile repository 28 having data accessed or obtained during a session.

In some embodiments, the insurance provider repository 32 may include a plurality of insurance provider records, each insurance provider record including, for instance, historical quotes provided by the insurance provider (which may also serve as calibration data when associated with user profiles by which the quotes were obtained), addresses of insurance provider servers, addresses of application program interfaces by which quotes are obtained for the insurance provider, affiliate marketing accounts with the insurance provider, or the like. In some embodiments, this information may be accessed by the controller 22 on behalf of the view generator 26 to form the user interface described below with reference to FIG. 11.

In some embodiments, the rate-factor model 34 is configured to receive attributes of the user and provide a plurality of outputs that indicate the relative effect of those attributes on insurance rates for that user. In some embodiments, the rate-factor model 34 is calibrated with the rate-factor model calibrator 36. In some embodiments, the rate-factor model 34 executes a process described below with reference to FIG. 5, and the rate-factor model calibrator 36 may execute a process described below with reference to FIG. 6. Together, these components may cooperate to give effect to the bottom portion of the user interface described below with reference to FIG. 4.

In some embodiments, the insurability model 38 is configured to receive a plurality of attributes of a user and output a score indicative of insurability of that user. In some embodiments, the insurability model 38 is calibrated by the insurability model calibrator 40. In some embodiments, the insurability model 38 executes a process described below with reference to FIG. 3, and the insurability model calibrator 40 execute a process described below with reference to FIG. 2. In some embodiments, the insurability model 38 outputs a value or set of values by which the upper portion of the user interface described below with reference to FIG. 4 is constructed.

In some embodiments, the model calibrator's 36 and 40 may calibrate the models 34 and 38 based upon data from a calibration data source 20. In some embodiments, the calibration data source 20 may generate calibration data. In some embodiments, the calibration data may be generated with an insurance-pricing analytics application 42, a calibration data acquisition module 40, and a calibration data repository 48. In some embodiments, the insurance-pricing analytics application 42 may be a standalone computer application that is operative to receive a query specifying attributes of a consumer and output one or more values indicative of a price quote for insurance, such as a plurality of values indicating a plurality of price quotes, for different insurance products or a single price quote for a single insurance product. In some cases, the query may specify the insurance product, such as by indicating an amount of coverage, a type of coverage, a type of insurance, an amount of deductible, and the like, and the insurance-pricing analytics application 42 may output a value indicative of a price of insurance, such as an estimated insurance quote corresponding to the query. In some cases, the insurance-pricing analytics application 42 may be configured to provide insurance pricing estimates for more than 100 million, more than 1 billion, more than 100 billion, or more than 1 trillion different user profiles (e.g., scenarios) specified by a query. Thus, evaluating every single permutation to obtain calibration data on every permutation of query may be computing-resource or time prohibitive. To mitigate these challenges, some embodiments may execute a process described below with reference to FIG. 7 with the calibration data acquisition module 44 to identify representative subsets of attributes, for instance representative partial user profiles, and then systematically query the insurance-pricing analytics application 42 with each of those representative partial user profiles in each value of other dimensions.

For example, some embodiments may determine representative vehicles, vehicle ages, user ages, user driving history scores, or the like in a given zip code by systematically varying these values in the zip code in queries and clustering according to the resulting price quotes. Some embodiments may then select a representative profile from each cluster, for instance based on a centroid of the cluster or a mean price quote of the cluster. Some embodiments may then apply those representative user profiles in every zip code (of which there are more than 40,000), for both males and then for females to populate the calibration data repository 48.

In some embodiments, the calibration data repository 48 may be populated with a calibration data set including a plurality of calibration records, each calibration record including a user profile having a set of attributes and an insurance price quote output by the insurance pricing analytics application 42 responsive to that user profile, for instance in response to a query specifying an insurance product and including the user profile. The user profiles need not be profiles of real users and can include simulated user profiles generated with the techniques described above by the calibration data acquisition module 44. Thus, some embodiments may relatively effectively sample the parameter space of the insurance-pricing analytics application 42 in a way that captures the variation of insurance prices within that parameter space without incurring the cost, delay, or requiring the computing resources to systematically explore every permutation of that parameter space, though embodiments are also consistent with other techniques by which every permutation is tested, which is not to suggest that other features described are not also amenable to variation. In some embodiments, the calibration data repository 48 may be queried by the insurance model calibrator 40 or the rate factor model calibrator 36 to obtain data by which the models 34 and 38 are calibrated.

In some embodiments, the insurance-pricing analytics application 42 may include a model for estimating insurance prices that is generated by analyzing state insurance filings by a plurality of different insurance carriers. Often, states require public disclosure of the processes by which insurance providers price insurance, but in many cases, these disclosures are not in machine-readable form, are very expensive, and consume hundreds or thousands of pages of government regulatory filings for each provider in each jurisdiction. In some cases, an entity providing the insurance-pricing analytics application may analyze these filings and generate the model that is interrogated by the calibration data acquisition module 44.

With the resulting relatively-expansive, relatively-representative, and relatively-large data set obtained by the calibration data source 20, various types of models may be calibrated by the model calibrators 40 and 36. In some cases, embodiments may obtain more than 10,000, more than 100,000, more than 1 million, and in many commercially relevant use cases, more than 10 million calibration records corresponding to different user profiles and resulting price quotes corresponding to those user profile from the insurance-pricing analytics application 42. In some embodiments, the resulting models may generalize based on this data, for instance with the regression or machine learning techniques described below, which is expected to be more robust than other rule-based techniques that are often relatively brittle and fail to adapt to variation in use cases or the market. That said, embodiments are also consistent with rule-based techniques for outputting the scores and rate factor listings described below, which is again not to suggest that other features described may not also be varied in some embodiments.

In other embodiments, the calibration data may be obtained with other techniques. For instance, in some cases, historical price quotes from insurance carriers responsive to user profiles may be logged and used with or instead of the calibration data described above. In some cases, these price quotes may be obtained through price quotes provided by insurance-provider servers 16, either via the insurance comparison application user interfaces described below, such as that of FIG. 11, or via an application program interface with a data feed through which these price quotes are ingested by the insurance comparison application 12, for instance, periodically as a batch process. In some embodiments, calibration data may be obtained, for instance, daily, weekly, monthly, or yearly, or less often or more often.

Similarly, in some embodiments, the above-described models 34 and 38 may be calibrated periodically, for instance daily, weekly, monthly, yearly, or more or less often. In contrast, these models 34 and 38 may be used relatively frequently, for instance more than 100 times per day, more than 1000 times for day, more than 10,000 times per day, or more than 100,000 times per day, for instance once during each of the above-describe sessions between a user computing device 14 and the insurance comparison application 12.

Insurability Scores

Figure 2:
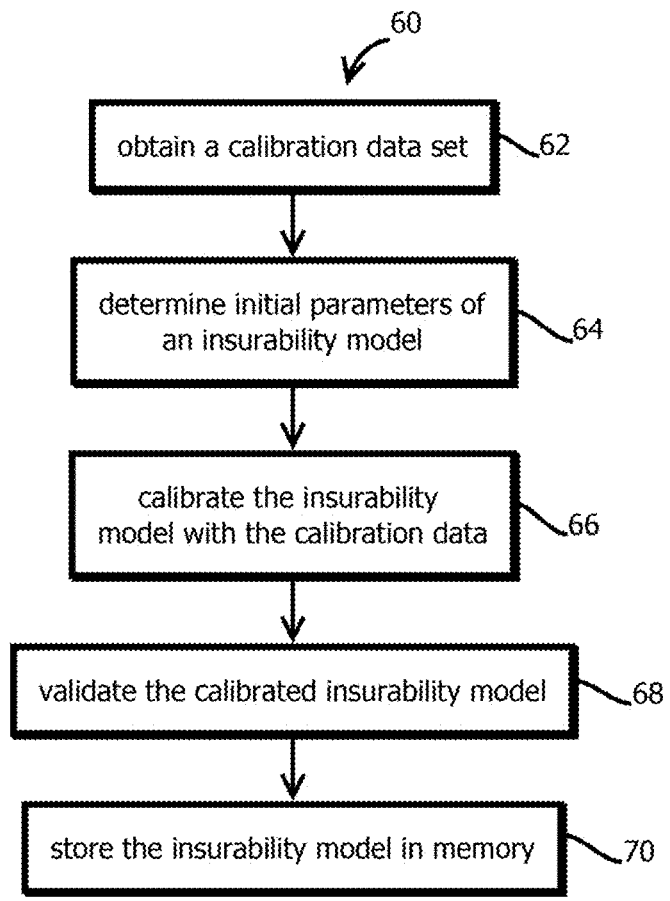
FIG. 2 is a flowchart of an example of a process to calibrate an insurability model in accordance with some embodiments of the present techniques.

FIG. 2 shows an example of an insurability model calibration process 60, which may be performed by the above-described insurability model calibrator 40 to calibrate the insurability model 38, though embodiments are not limited to that implementation, which again is not to suggest that other descriptions are limiting.

In some embodiments, the process 60, like the other processes and functionality described herein, may include additional operations beyond those depicted, may have some of the operations depicted replicated during a given instance of the process, for instance, in concurrent instances of a given operation, and may have operations omitted in some embodiments, again is which is not to imply that other descriptions are limiting. In some embodiments, the operations of the process 60 and the other processes and functionality described herein may be provided by executing program code stored on a tangible, non-transitory, machine-readable medium, such that when those instructions are executed by one or more processors, for instance, in one or more of the computers described below with reference to FIG. 10, the described functionality is effectuated. In some embodiments, the medium may be distributed, for instance, in persistent or dynamic memory of a plurality of different computing devices, with different computing devices having different subsets of the instructions, a scenario which also falls within the scope of the term "medium" (singular) herein.

In some embodiments, the process 60 begins with obtaining a calibration data set, as indicated by block 62. In some cases, the calibration data set may be obtained from the above-described calibration data source 20. In some embodiments, more than 10,000 calibration records, for instance more than 1 million or more than 10 million calibration records may be obtained. In some embodiments, each calibration record may include a respective quote for insurance and a respective set of consumer attributes upon which the respective quote is based, for instance, a set of consumer attributes corresponding to or including some or all of the attributes described above with reference the user profiles. In some embodiments, the user attributes include direct attributes of users, like age, gender, a driving history score, and values indicating whether the user currently has insurance. In some cases, the attributes include attributes of the user's geolocation, such as a zip code in which the user is presently residing. In some embodiments, the attributes include attributes of the user's vehicle, such as a make, model, or a year of the user's vehicle for which insurance quotes are requested.

Some embodiments include determining initial parameters of an insurability model, as indicated by block 64. In some cases, the initial parameters may be determined randomly, for instance, with a pseudorandom algorithm, like a linear shift register or by querying a randomization function of a central processing unit. Some embodiments may repeatedly calibrate a plurality of different candidate models with different randomly selected initial parameters to mitigate the risk of a local minimum or local maximum being reached during the calibration process and resulting in an inferior model calibration. Some embodiments may determine an aggregate measure of fitness or an aggregate measure of error relative to a calibration data set for each of the candidate models (e.g. with different initial parameters) and select a calibration model from the candidate calibration models that has a highest measure of aggregate fitness or a lowest measure of aggregate error.

The aggregate measure of fitness or error may be based upon an amount of difference between values output by the calibration model and calibration records. For instance, some embodiments may attempt to predict based on the insurability score a plurality of prices occurring in calibration records by inputting consumer profile attributes into the selected candidate insurability model. Some embodiments may then determine, for instance, a root mean square error between predictions of the model and the actual values in the corresponding calibration records, for instance, as an aggregate measure of error. Or some embodiments may determine a percentage that are within a threshold of the actual values or a percentage that are outside a threshold difference relative to the actual values in the calibration records. In some embodiments, a subset of the calibration records may be withheld from calibration and used to evaluate the fitness of the candidate calibrated model that is selected, for instance, with cross validation, in order to guard against the risk of overfitting to the calibration data.

In some embodiments, the output of the calibrated model is a single value responsive to a set of input attributes of a user profile, for instance, four or more, five or more, or ten or more of the above-described attributes of the user. In some embodiments, the output value is an integer or natural number that varies through a range, for instance from 0 to 100, or in some cases, the value is a category, such as a binary value indicating good or bad or a more granular ordinal category, such as one corresponding to a letter grade of A, B, C, D, or F, or zero to five stars.

Thus, some embodiments may calibrate the insurability model with the calibration data, as indicated by block 66. How the model is calibrated may depend in part upon the type of model. In some embodiments, the model may be a machine learning model, such as a supervised machine learning model that is calibrated by training the machine learning model with the calibration data. Examples include a neural network, a decision tree, a boosted classification tree, a support vector machine, a naïve Bayes classifier, or the like. Some embodiments may train the model by attempting to predict prices in calibration records based on attributes in those records and then adjusting the model to improve the predictions, or some embodiments may attempt to predict other values, such as a risk score associated with the price by the insurance pricing analytics application.

In some embodiments, the model may be trained with, for example, a gradient descent optimization, such as a stochastic gradient descent used to train a neural network. Some embodiments may determine initial parameters, such as initial weights of a neural network with multiple hidden layers and output perceptrons corresponding to ranges of scores, and then iteratively adjust those parameters in a direction that decreases an aggregate amount of error or increase as an aggregate amount of fitness, as indicated by a partial derivative of the aggregate measure of error or fitness relative to the respective parameters. Some embodiments may repeatedly make this adjustment after determining these partial derivatives until a termination condition occurs, such as less than a threshold amount of change in the aggregate measure of fitness or error between consecutive iterations, or upon a threshold amount of iterations, such as a threshold number.

In another example, a decision tree or classification tree may be trained with, for example, a CART algorithm. Some embodiments may iteratively select a dimension of a user profile, such as one of the attributes or interaction between to the attributes, and then select a binary split in that dimension at a value that is determined to minimize an aggregate amount of error or maximize an aggregate amount of fitness of the model, for instance, with a greedy optimization in each iteration. Some embodiments may then iteratively repeat this process in different dimensions, selecting values in those respective dimensions to apply a split based on a value that is determined to minimize an aggregate amount of error or maximizes an aggregate amount of fitness. Some embodiments may repeat this process through each of the dimensions and then prune back the model, for instance, by a threshold amount of splits. In some embodiments, the sequence of dimension selections and splits may divide a parameter space of the model into different regions each corresponding to different insured ability scores.

In some embodiments, the model may be a regression, such as a linear regression. For example, some embodiments may calculate a weighted sum of the attributes of the user profile including, in some cases, a weighted sum that includes interactions between the attributes, such as pairwise interactions or three-way interactions. In some embodiments, weights may be determined, for instance, with the above-described gradient descent technique or with other approaches, for example, with simulated annealing or Bayesian optimization, or with brute force approaches, for instance, by iterating through a range of candidate weights for each weight through every permutation at a step size that is sufficiently small as to adequately approximate a global optimum set of weight values. In some embodiments, the techniques described above for randomizing initial parameters of the weights and cross validating and selecting among candidate models may be implemented to guard against the risk of arriving at a local minimum or local maximum, depending upon whether minimizing error or maximizes fitness.

In some embodiments, the model may output a continuous differentiable (e.g. smooth) surface in a five (or four, three, or two) or higher dimensional space. For instance, some embodiments may define a continuous differentiable surface of insurability score in a four, five, seven, ten, or higher dimensional input parameter space, with an additional output dimension corresponding to the insurability score.

In some embodiments, the above-described machine learning and regression techniques may be combined. For instance, some embodiments may segment the parameter space of the model with a decision tree or classification tree, and then within each of the segments, some embodiments may determine a regression that specifies a surface within that segment by grouping calibration records according to the segments of the parameter space formed with the decision or classification tree and then performing the regression on the different groups of calibration records to produce a plurality of regressions, each corresponding to a different segment of the parameter space defined by the decision tree. Some embodiments may then associate those regressions with the different segments and select regressions by applying input user profiles to the decision or classification tree and then the corresponding segment specified by the decision or classification tree.

Or some embodiments may calibrate different instances of one of the above types of models for each geographic area (e.g., zip code), for instance, forming a matrix of weights for a linear regression with rows corresponding to attributes and columns corresponding to zip code. Or some embodiments may form a distinct model for each of a higher dimensional segment of the above-described input parameter space, e.g., one for each square, cube, or hypercube.

In some embodiments, as noted above, the process 60 may include validating the calibrated insurability model, as indicated by block 68. In some embodiments, this may include the above-described cross validation operations. Some embodiments may determine whether an aggregate measure of fitness or error of the insurability model after calibration, for instance, when tested against a set of calibration records withheld during operation 66, satisfies a threshold. Upon determining that the calibrated insurability model does not satisfy the threshold, some embodiments may repeat the operations of block 64 and 66 until a calibration insurability model is validated.

Upon validating the calibrated model, some embodiments may store the resulting insurability model in memory, as indicated by block 70. In some embodiments, storing the insurability model may include setting a plurality of parameters of the above-described insurability model within the insurability model 38. These parameters may be, for example, sequences of dimensions and values in those dimensions by which a parameter space is partitioned in a split, for instance, in a trained decision or classification tree. These parameters may include weights (also referred to as coefficients) in a regression or weights in a neural network. Or these parameters may be parameters of other types of machine learning models like those described above.

Figure 3:
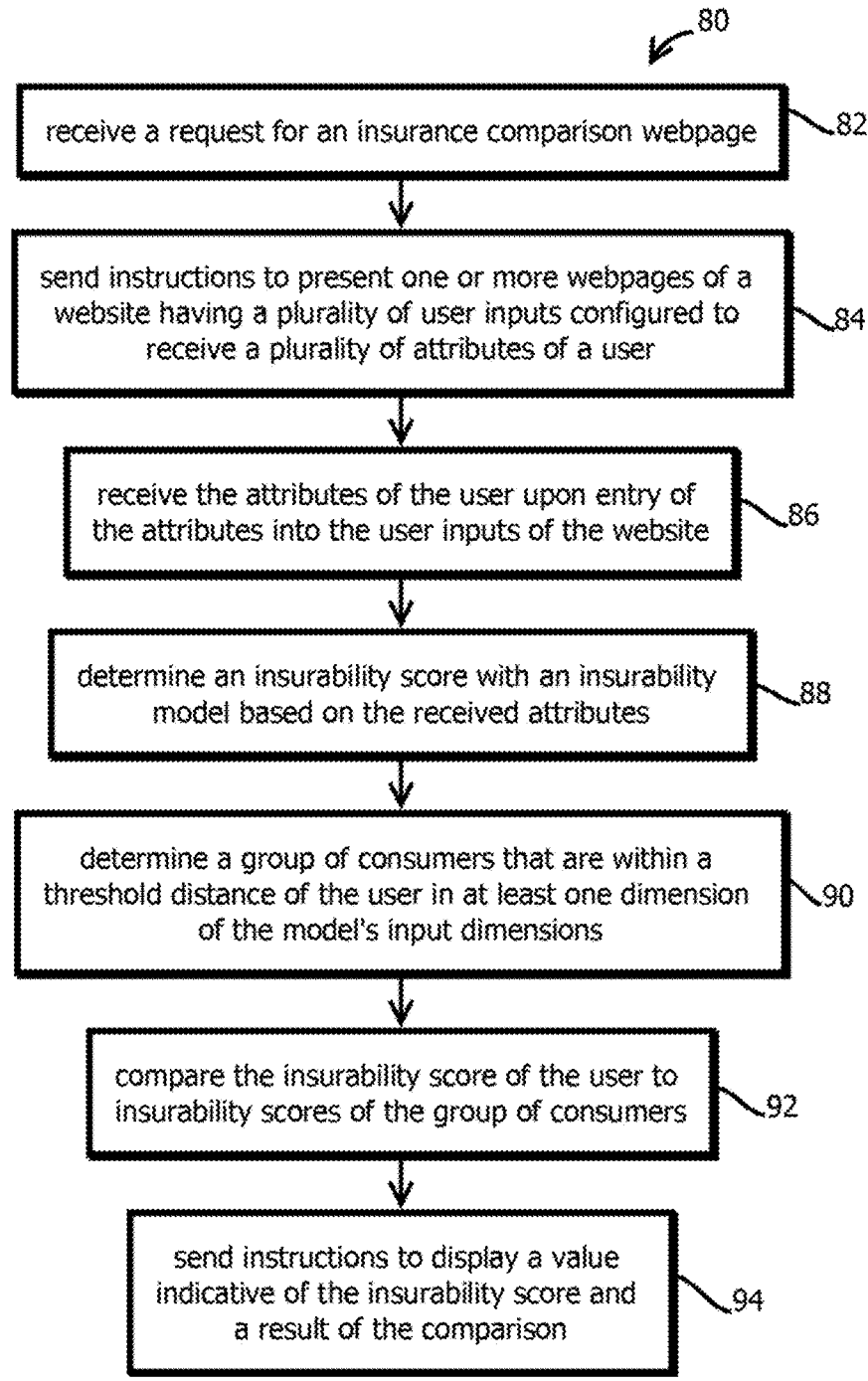
FIG. 3 is a flowchart of an example of a process to determine an insurability score in accordance with some embodiments of the present techniques.
Figure 4:
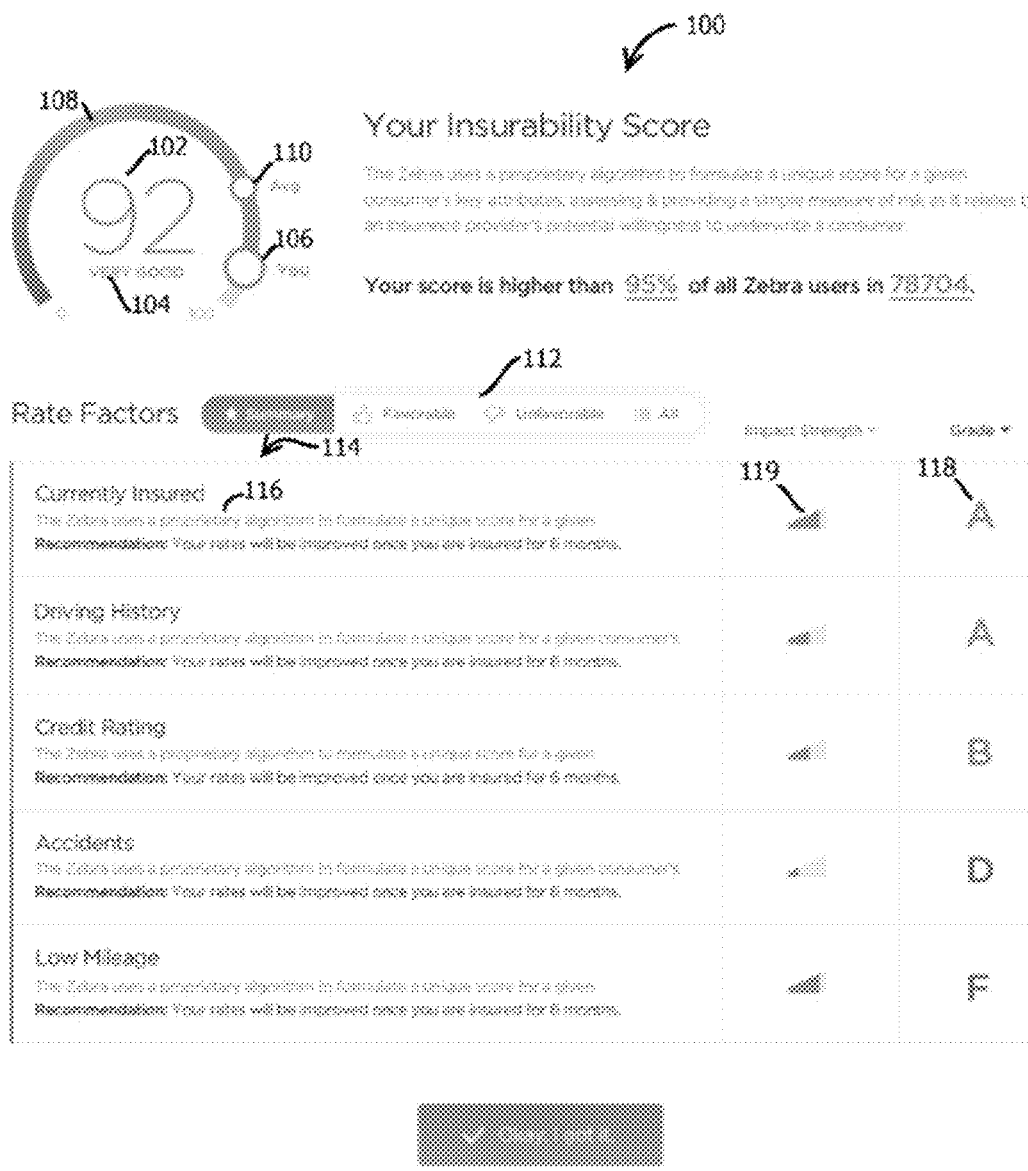
FIG. 4 is an example of a user interface by which an insurability score and rate factors are conveyed to a user in accordance with some embodiments of the present techniques.

FIG. 3 shows an example of a process 80 by which the above-described insurability models may be applied to infer an insurability score for a given user. Some embodiments may initiate the process 80 upon a user beginning a session with the above-described insurance comparison application 12. In some embodiments, this may include receiving a request for an insurance comparison webpage, as indicated by block 82, for instance, from one of the above-described user computing devices 12 executing a browser in which a user has navigated to a URL that a DNS associates with an Internet Protocol address of the insurance comparison application 12 on the Internet 18. In some embodiments, the request may be a GET request in a hypertext transport protocol request.

Next, some embodiments may send instructions to present one or more webpages of a website having a plurality of user inputs configured to receive a plurality of attributes of a user, as indicated by block 84. In some embodiments, the instructions may be sent in a sequence of exchanges with a user computing device in which a user enters some of the attributes, and then additional instructions are sent to instruct the user computing device to display another user input by which another subset of attributes are obtained.

In some embodiments, a single webpage may be maintained, with a single document object model on the user computing device, and instructions executing within a web browser may dynamically reconfigure that document object model responsive to data exchanged with the insurance comparison application 12, without reloading the entire webpage. For instance, JavaScript™ or web assembly code executing within a web browser and downloaded from the insurance comparison application responsive to the above-described GET request may, for instance, send attributes to the insurance comparison application 12, request content responsive to the entry from the insurance comparison application 12, and modify the document object model currently existing within the web browser, without reloading an entire new webpage, to provide relatively low latency responses to the user. In some embodiments, this may include traversing the document object model to identify elements, like div boxes, within the document object model to be deleted, updated, or to identify places within the document object model to add elements. In some embodiments, the document object model may be a virtual document object model configured to provide relatively low latency traversal.

In some embodiments, a sequence of preliminary insurability scores may be calculated and presented to the user, for instance, using the user interface described below with reference to FIG. 4, as the user enters each attribute in the plurality of user inputs. For instance, some embodiments may receive a first attribute and, then, determine a insurability score using the techniques described herein based upon that first attribute and a set of default attributes for the rest of a user profile by which the insurability scores determined. In some embodiments, the default attributes may be attributes corresponding to a measure of central tendency of all user profiles of user profiles within a geographic area, such as a zip code, county, city, or state, of a user, or in some embodiments, the default attributes may be a measure of central tendency of user profiles of other users who have the same set of attributes has have already been entered by the user. In some embodiments, these default user attributes may be calculated in advance and indexed, for instance, for one, two, three, or four, or more entered user attributes, and the resulting default attribute sets may be stored, for instance, in a prefix tree to facilitate relatively fast, low latency retrieval of these default attributes. Based upon the combination of the user entered first attributes and the remaining default attributes, some embodiments may determine a preliminary insurability score and cause that preliminary insurability score to be presented to the user with the techniques described elsewhere herein. In some embodiments, upon a user entering a second attribute, this approach may be repeated, using both the first and second user supplied attributes, and default attributes for the remainder of the attributes of the user profile, which in some cases may change based upon the additional specificity gained with the second attribute supplied by the user. Thus, some embodiments may, for instance, navigate to a different branch or some branch of the above-described prefix tree to obtain an updated set of default attributes to update the preliminary insurability score. Thus, a user may see how the insurability score changes with each entered attribute and develop an intuition about how their attributes affect their insurability score.

In some embodiments, five (or four, three, or two) or more attributes may be entered by the user, for instance, seven or more or ten or more attributes, and some embodiments may determine an insurability score with the insurability model based on the received attributes, as indicated by block 88. In some cases, this may include inputting a user profile having these attributes into the above-described insurability models, such as those calibrated with the process of FIG. 2 and outputting an insurability score, for instance, by isolating a point on the above-described surface in a five (or four, three, or two) or higher dimensional space of input dimensions or by outputting a score from a perceptron in a neural network, or by identifying a segment of a parameter space with a classification tree or decision tree.

In some embodiments, the user may benefit from context provided by a comparison between their insurability score and those of other consumers. To this end and others, some embodiments may determine a group of consumers (e.g., simulated or real) for comparison set, for instance, by determining a group of consumers that are within a threshold distance of the user in at least one dimension of the model's input dimensions, as indicated by block 90. In some cases, this may include determining a group of consumers that are at the same value in the one dimension, for instance, a group of consumers that are in the same zip code as the user. Or in some cases, the group of consumers may be consumers that are within a threshold distance according to multiple dimensions, such as each of the input dimensions of the models input parameter space. In some embodiments, consumer profiles may be formed into vectors, with a sequence of values corresponding to the attributes along each of the dimensions (e.g., values in those dimensions), and in some embodiments may determine the group of consumers based upon different distances between the vectors, such as those consumers that are within less than a threshold angular distance determined by pairwise cosines of the angles between the vectors, or those consumers within less than a threshold Minkowski distance of their respective vectors.

Next, some embodiments may compare the insurability score of the user to insurability scores of the group of consumers, as indicated by block 92. In some embodiments, the insurability scores of the group of consumers may be precalculated, stored, and retrieved for lower latency responses, for example, for every value within the at least one dimension or permutations of multiple dimensions. In some embodiments, the insurability scores for the group of consumers may be obtained from the calibration data, or the insurability scores may be logged based upon previous user interactions with the above-described insurance comparison application 12.

In some embodiments, the comparison may be a comparison between a distribution of the insurability scores of the group of consumers and the insurability score of the user, for instance, based upon statistics of the distribution. In some cases, the distribution may be a Gaussian distribution or modeled as a Gaussian distribution, and the statistics may include a mean and a measure of variation, such as a variance or standard deviation. Or other measures of central tendency may be used, such as a mode or median insurability score from the group of consumers. In some embodiments, the comparison includes determining a difference between the insurability score of the user and a measure of central tendency of the insurability scores of the group of consumers. In some embodiments, comparing includes comparing this difference to the measure of variability of the insurability scores of the group of consumers, for instance, determining how many standard deviations or units of variance account for the difference between the measure of central tendency of the insurability scores of the group of consumers and the insurability score of the user. In some embodiments, the comparison includes determining a percentile of the insurability score of the user among the insurability scores of the group of consumers, for instance, indicating whether the user is in the top quartile, the bottom half, the 95th percentile, or the like, or what percentage of users in the group have higher or lower insurability scores than the user.

Next, some embodiments may send instructions to display a value indicative of the insurability score and a result of the comparison, for instance, to a user computing device web browser, as indicated by block 94. In some embodiments, the sent instructions may include instructions that cause the user computing device to render the upper portion of the user interface described below with reference to FIG. 4.

In some embodiments, the user interface displaying the insurability score may be enriched with the result of various other processing steps. In some embodiments, the insurability score may be normalized, for instance relative to a distribution of insurability scores among a group of users. In some cases, some embodiments may identify a group of users, for instance in the same geographic area, like the same zip code, or use a group of all users, for instance an entire country as the normalization group. Some embodiments may determine a maximum insurability score for that group or an insurability score corresponding to a threshold amount of the distribution, for instance an insurability score corresponding to three standard deviations plus a mean insurability score for the group. Some embodiments may then normalize relative to this maximum insurability score. In some cases, this may include dividing the user's insurability score by this maximum insurability score and then multiplying by 100 to indicate a percentage of the maximum. Some embodiments may compare the insurability score to the threshold maximum insurability score and in response to determining that the user's insurability score exceeds that maximum insurability score, some embodiments may set the users insurability score to the maximum insurability score, to avoid having values greater than 100.

In another example, some embodiments may categorize the insurability score, for instance by applying an ordinal categorization to the score, like a ranking from 1 to 5, or applying a text description corresponding to various ordinal categories, like bad, very bad, okay, good, and very good. In some embodiments, each of these ordinal categories may be associated in memory with a range of insurability scores, and some embodiments may compare the user's insurability score to each of these ranges to identify a range in which the user's insurability score falls, thereby identifying a ordinal category to be associated with the user's insurability score. In some embodiments, different sets of these ranges may be defined for different areas of the input parameter space, e.g., a different set of ranges for each zip code, and the range corresponding to the user may be accessed and interrogated to identify which range includes the user's insurability score for that zip code. Thus, a given score may be "excellent" in one zip code and merely "good" in another. Or the same set of ranges may be applied uniformly, which is not to suggest that other descriptions are limiting.

In some embodiments, the insurability scores of a user and of a statistic describing a distribution of insurability scores of a group of users, like the groups described above, may be translated into a different coordinate system corresponding to a visual presentation of the insurability scores and related statistics. In some embodiments, this may include translating these scores into, for instance, Cartesian coordinates, or polar coordinates, or into a single dimensional coordinate system, like an angle, or position along a straight or curved line, or color in a spectrum or gradient. In some embodiments, this may include determining vertical and horizontal pixel positions in a display screen based upon the insurability score of the user and the related statistics for the group.

Some embodiments may translate the insurability score of the user and a measure of central tendency of the insurability scores for the group into respective angular coordinates, as shown in FIG. 4. For example, some embodiments may convert these values into angles spanning a range of less than 360° and more than 180° or equal to these values. In some cases, the conversion may be proportional, for instance, with an insurability score of zero corresponding to an angular displacement of 0°, and an insurability score of 100 corresponding to a maximum angular displacement in the range. In some embodiments, these angles may then be converted into vertical and horizontal pixel positions in a display screen.

The translation between insurability scores, angular positions (or other coordinate systems) and pixel positions may each be performed at the insurance comparison application 12 or at the user computing device 14, or a combination thereof. For instance, in some cases, the insurance comparison application 12 may send instructions to the user computing devices 14 that upon being executed by the user computing devices 14 in response to receiving, for instance, an insurability score, or an angular position, cause the user computing device 14 to perform one or more of the above-described subsequent translations. In some cases, sending these instructions and data by which an image is formed may be lower bandwidth and lower latency than forming the entire image with the insurance comparison application 12 and sending the image, for instance, as a PNG file, in some cases with the instructions and data taking up less than 10% of the amount of data consumed by such an image file. Or, to simplify client-side operations, some embodiments may implement these operations within the insurance comparison application 12.

Figure 11:
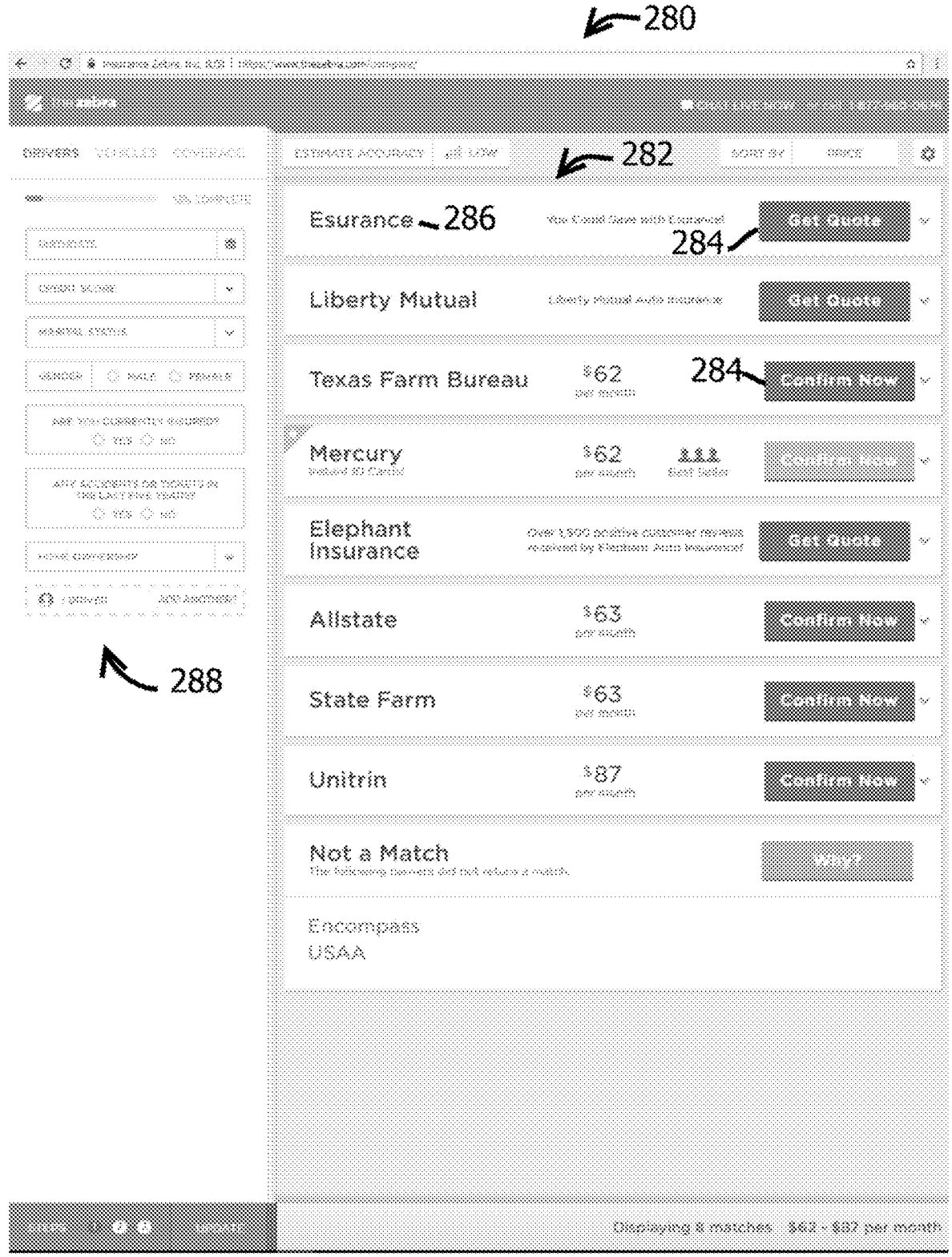
FIG. 11 is an example of a user interface by which a user is presented with a plurality of insurance options in accordance with some embodiments of the present techniques.

Some embodiments may further determine factors to display along with the insurability score to inform the user of how the rates they see, e.g., in the user interface of FIG. 11 alongside that of FIG. 4. In some embodiments, different users may see different factors depending upon which factors dominate in their insurance pricing quotes.

Figure 5:
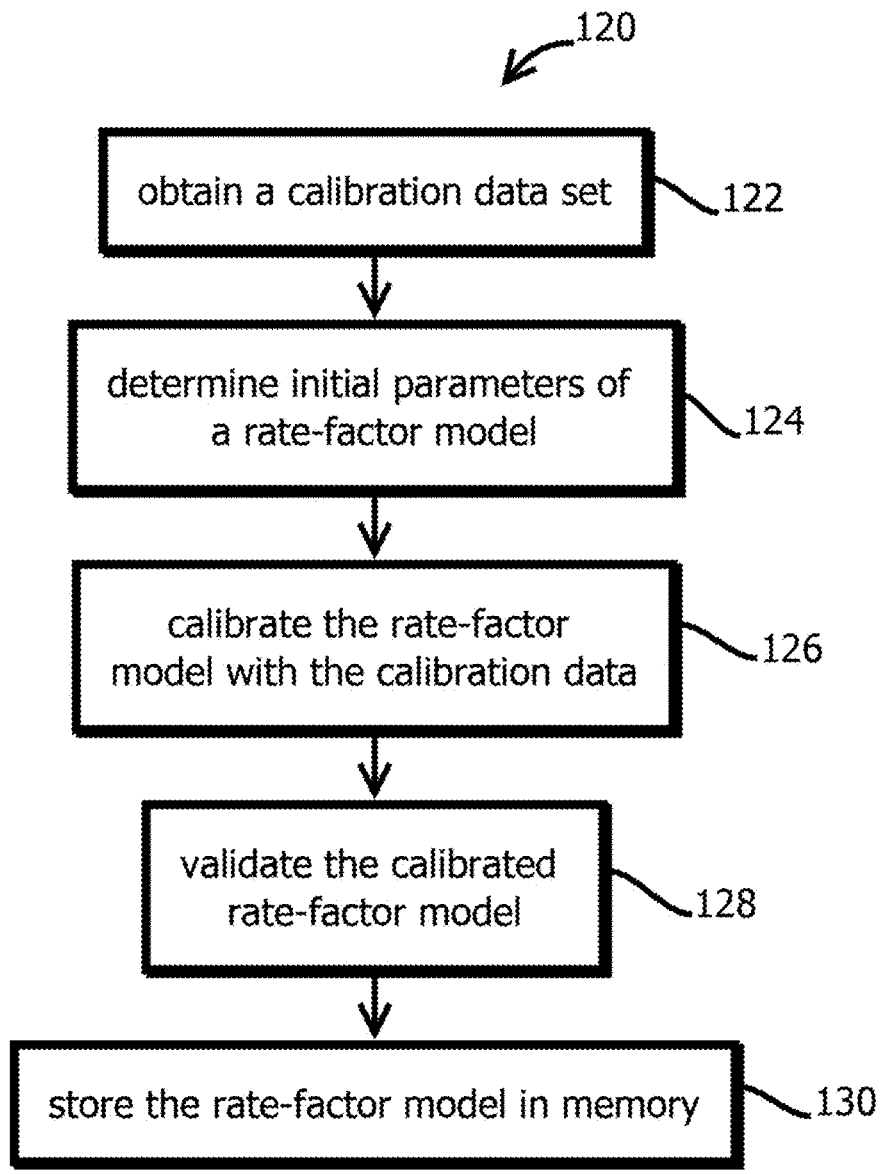
FIG. 5 is a flowchart of an example of a process to calibrate a rate factor model in accordance with some embodiments of the present techniques.

Rate factor determination is described in greater detail below with reference to FIGS. 5-6. Some embodiments may select the factors to show based upon the contribution of the respective factor in a weighted sum, for instance by multiplying each respective factor by its corresponding weight and then ranking the corresponding products to determine which factors contribute the most. Some embodiments may select the factors according to a threshold number of values in this ranking, for instance the top five factors. In another example, each attribute of the user may be compared to a distribution of the respective attributes among a larger population of users, such as one of the above-describe groups or all users, for instance to determine a percentile of the user in the population. Some embodiments may subtract 50 from that percentile and take the absolute value. Some embodiments may then rank the attributes based upon the resulting absolute value and select those having the largest absolute values in the rankings, such as those having above a threshold absolute value or those having above a threshold rank, for instance to identify the most anomalous attributes in the user's profile.

Some embodiments may determine ordinal categorizations, for instance, letter grades, binary thumbs-up or thumbs down, determinations of good and bad, or scores from 0 to 5 stars, for each attribute that is selected for display. In some embodiments, these ordinal categories may be determined, for instance, by segmenting a distribution of values of each respective attribute or one of the above types of groups or all users, for instance, dividing the population into quintiles, deciles, or top half and bottom, and associating each ordinal category with a respective range of values of the attribute that bound those segments, for instance, associating a thumbs down value with a range of amounts of tickets in the preceding two years of greater than three.

FIG. 4 shows an example of a user interface 100 which may be displayed upon a display screen of one of the above-described user computing devices 14, for instance upon completing the process of FIG. 3 and the process of FIG. 6 described below. In some embodiments, the insurability score user interface 100 may be displayed adjacent a listing of insurance options like that described below with reference to FIG. 11. In some embodiments, the insurability score user interface 100 may include various user inputs by which a user may interact with the user interface 100 to obtain additional information or vary the information displayed. For instance, different regions of a display screen may be mapped to event handlers that are configured to handle specified events occurring within those regions of the display screen, like in onClick event, and onTouch event, a clickRelease event, or a touchRelease event. In some cases, these event handlers may send an indication of the event back to the system 12 or access data resident in cache memory of the user computing device 14 to update a display responsive to the user request, for instance, by manipulating a document object model or requesting a new webpage.

In some embodiments, the user interface 100 includes a view of the insurability score 102 and an ordinal categorization of the insurability score 104. In some embodiments, visual attributes of these elements 102 and 104, such as color, font size, boldness, transparency, or drop shadows, or on-screen movement like animated oscillation, may be modified based upon, for instance, the ordinal categorization or the insurability score, e.g., with different colors corresponding to different scores, for example. In some embodiments, the user interface 100 further includes an icon 106 representing the user's insurability score on an arc 108. Some embodiments further include an icon 110 representing a group statistic, such as a measure of central tendency, of a group of users' insurability scores on the arc 108. In some embodiments, the positions of these icons 106 and 110 on the arc 108 may be determined by the above-describes translation of insurability scores into angles, for instance, with the angle being measured about a center of the arc 108 from an edge of the arc 108 labeled zero, thereby forming a relatively glanceable gauge of the user's score with context provided by the group statistic.

In some embodiments, visual attributes of the icons 106 and 110 may be modified based upon their angular position, which as noted above may be based upon the value of their insurability score. For instance, in some cases any of the visual attributes described above, such as color may be modified. In some embodiments, a color of the arc 108 may vary through a spectrum, for instance, linearly, ranging from a color of red at the value labeled zero to a value of blue at the end labeled 100, and embodiments may determine a corresponding color of the icons 106 and 110 that matches to their angular position, for instance, with the color of the icons 110 and 106 ranging from red to blue as the icons move about the arc 108 from angles close to 0 to red for angles close to 100. In some embodiments, the arc 108 may have visual attributes that vary based upon the position of the highest angular position of the icons 110 and 106. For instance, some embodiments may represent the arc 100 with a segment of a color gradient that ranges from red to blue between 0 and 100, with the segment extending from the value of zero to the largest angular position of the icons 106 and 110, and with the remaining segment of the arc 108, for instance, being shown in a light gray color to provide the user a visual representation of the user's insurability score and how that insurability score relates to a larger population. It is expected that the visual representation of FIG. 4 will informed the user while imposing relatively low cognitive load, by providing a glanceable user interface that intuitively represents the users insurability score relative to that of a population, though it should be emphasized that embodiments are not limited to systems that provide this benefit, which is not to imply that other descriptions are limiting.

In some embodiments, the user interface 100 further includes a ranking of rate factors 114 and a user input 112 by which the user may re-rank in opposing order, those factors with the faceted input, for instance, requesting the most positive or negative be ranked at the top of the list 114 of rate factors. The factors are shown in an ordered list, ranking from most positive to most negative factors first. The factors may be determined with the processes of FIGS. 5 and 6 described in greater detail below. In some embodiments, the factors include the attributes of the user profile by which the insurability score is determined. In some embodiments, each item in the list includes a text description of the factor 116, and in ordinal categorization of the factor 118, for instance a letter grade, a thumbs up or thumbs down sign, or the like. Again, in some cases, the visual attributes of the ordinal categorization 118 may be varied, for instance, with colors corresponding to colors on the arc 108.

In some embodiments, each item in the list 114 includes an icon 119 with a visual attribute that scales (e.g., horizontally or vertically across the icon) based on an amount of importance of the corresponding factor 116. Some embodiments may pre-render server side a collection of images corresponding to different scaling and select among and send those images for display, or some embodiments may conserve bandwidth by rendering the images client-side, e.g., by forming the images with cascading style sheets settings. In the illustrated example, the icon 119 includes two different colored regions that vary in their proportion of the shape of the icon 119 consumed by the respective colored region based on the amount of importance of the factor in determining insurance rates, with the amount of area occupied by the left colored region indicating the importance of the respective factor. For example, in the illustrated view, the "currently insured" factor is depicted as substantially more important than the "accidents" factor.

In some embodiments, importance may be based upon an amount of variation in the insurance rate in a training set explained by the corresponding factor when analyzing a training set, for example, with principal component analysis. In some embodiments, the amount of importance may be based on a ranking of the factors. In some embodiments, the amount of importance may be independent of the ordinal categorization 118, for example, in some cases in which a linear model is used.

The importance may be constant for a given factor or may vary conditionally on other factors or that given factor for which importance is indicated. In some cases, for instance, different factors may be more important in different regions of the country, or for different ages or makes or models of cars. In some cases, the amount of importance may vary along with the ordinal categorization 118, for example, in cases in which certain ordinal categorizations are correlated with a greater importance and other ordinal categorizations are associated with lesser importance. In other words, insurance rates may be explained more strongly by certain factors when those factors are particularly good or particularly bad.

Thus, the view of FIG. 4 may both indicate whether a user has relatively good or relatively bad attributes compared to a reference group and how important those different attributes are in the insurance prices presented to that user. This is expected to be particularly helpful in cases in which certain attributes may vary relative to other attributes in their importance. A user may obtain a deeper understanding of causes of their insurance rates quoted when one attribute is particularly good or particularly bad but is not particularly important, or vide versa. That said, not all embodiments offer this benefit, as there are multiple independently useful techniques described, which is not to suggest that any other description is limiting.

Rate-Factors

In some embodiments, the list of rate factors 114 in the user interface 100 of FIG. 4 may be determined by the above-described insurance comparison application 12 by executing a process described below with reference to FIG. 6 that uses a model trained with the process of FIG. 5. Though it should be noted that embodiments are not limited to these implementations, which is not to suggest that other described features are limiting. In some embodiments, the process 120 of FIG. 5 is used to train a rate-factor model. The process 120 may be executed periodically, for instance, nightly, weekly, monthly, or yearly, for example, to update the model based upon additional calibration data.

In some embodiments, the process 120 includes obtaining a calibration data set, as indicated by block 122. In some embodiments, this may include the operations described above with reference to block 62 of FIG. 2 by which the other model of FIG. 3 may be calibrated.

Some embodiments of the process 120 include determining initial parameters of a rate-factor model, as indicated by block 124. In some embodiments, this may include determining initial parameters of various models used in determining rate factors. Examples include a model to determine a measure of an amount by which each attribute contributes to price of insurance for a user and a model to place these resulting measures of amounts of contribution towards price into different ordinal categories, such as the letter grades of FIG. 4 or various other ordinal categories, like thumbs up or thumbs down, one to five stars, or other designations (like good, average, or bad). In some embodiments, initial parameters may be selected with the techniques described above with reference to block 64 FIG. 2, for instance, with randomized initial parameters used to seed multiple candidate models.

Some embodiments may calibrate the rate-factor model with the calibration data, as indicated by block 126. Calibration may depend upon the type of model, examples of which follow.

In some embodiments, a model to determine amounts that each attribute contribute to price of insurance for a user may be trained based upon the calibration records from the calibration data source 20 described above. Some embodiments may train a machine learning model to infer a price of insurance for user based on attributes of the user using the calibration records, for instance, with the above-described model calibration techniques discussed with reference to FIG. 2, including various forms deep learning using gradient descent. Some embodiments may then modify this model to output values indicative of, for example, partial derivatives of price with respect to each attribute, or amounts of variation in price explained by a given attribute.

To obtain partial derivatives, some embodiments may replicate multiple copies of the model and modify inputs to all but one of the copies such that a different one attribute is modified by a relatively small amount in the respective copy. The amount added may be normalized, e.g., relative to a distribution of the attribute, e.g., corresponding to a 0.1% increase in the amount of the population that has a value less than the modified attribute relative to the unmodified attribute. As a result, some embodiments may have a copy of the model that receives the unmodified attribute set and then a copy of the model for each attribute in which a different attribute is modified by a relatively small amount in each of the copies. Some embodiments may then determine partial derivatives of price (which includes estimating a partial derivative) by calculating a difference in price between the initial model and the price output from the copy of the model that receives a modified version of one of the attributes. This difference in price may then be divided by the amount by which the attribute is changed to estimate or otherwise determine a partial derivative with respect to that attribute of price. Thus, upon training a single model to estimate price, some embodiments may then construct a modified model that estimates the contribution of each attributes towards price near a point in the insurance pricing parameter space corresponding to the user's attributes.

In another example, embodiments may determine the rate factors based on the difference for the respective attributes of the user relative to a measure of central tendency for the attribute among a population (e.g., one of the above described groups, such as other users in a zip code or all users). In some embodiments, the copies of the model may each receive a version of the respective attribute that is the measure of central tendency of that attribute among the group, e.g., the unmodified model may input an attribute indicating the user is 35 years old, while the measure of central tendency value for the group may be 45 years old. The difference in inferred price between the unmodified model and the modified model in which the 45 year age is input may be indicative of the contribution of age to the price of insurance.

In some embodiments, some attributes may not be cardinal values, e.g., make and model of a car. In some cases, these values may be converted into cardinal values, e.g., by retrieving an associated risk score associated with the user-supplied value, and using the risk score as the attribute. In some cases, a plurality of values, such as driving history values, may be combined in a driving history score, such as a weighted sum of accidents and tickets, and the score may serve as the attribute.

In another example, some embodiments may determine a regression of price with respect to the user supplied attributes. In some embodiments, this may be a linear regression determined with the techniques described above with reference to model training in FIG. 2, e.g., by training to predict price in the latter and training to predict risk in the other. In some cases, each attribute may be associated with the weight, and price may be estimated by the model with a weighted sum in which each attribute is multiplied by its respective weight and the resulting products are summed. In some embodiments, these weights may serve as the measure for each attribute, or in some cases the product of a given weight and an attribute may serve as the measure by which an attribute contributes to price.

In some embodiments, the regression may account for interactions between variables, for instance, by having weights that are multiplied by the product of two attributes. In some embodiments, the techniques described above by which models are replicated with modified versions of individual attributes being input into the replicated versions of the model may be used to estimate the partial derivatives with respect to the attributes in nonlinear regressions. Or in some embodiments, the modified model technique above may be implemented in a form in which the measure of central tendency of each attribute is input into a respective modified model (e.g., modified in the sense that one input is different and refers to a group statistic). Or some embodiments may determine a closed form partial derivative.

As noted, some embodiments may also have a model to classify the amount by which the different attributes contribute to price into one of a plurality of ordinal categories. In some embodiments, calibration of these models may include specifying ranges corresponding to each ordinal category for each attribute. Thus, some embodiments may include a list of ranges specific to each attribute, with each item in the list being a range of amounts by which that attribute contributes to price, and each range corresponding to an ordinal category, such as a letter grade like A+, A, A−, B+, B, B−, and so on down to an F. In some embodiments, the ranges in the list may be different for different attributes.

These ranges for each attribute may be determined with a variety of different techniques. In some embodiments, the ranges may be determined based on a comparison between the user and a distribution of amounts by which a given attribute contributes to price for a population of users. The population of users may be chosen with a variety of different techniques (and these approaches may be used to select the various comparison groups described elsewhere herein). For example, the population of users may be all users or all users within a threshold distance on one or two dimensions of a parameter space of the attributes. Examples include users who are of the same gender as a user, all users, users who are in the same zip code as the user, users who are in the same decade of life as the user, combinations thereof, and so on.

Some embodiments may determine a histogram of amounts by which a given attribute contributes to price for users within the population and then segment that distribution, for instance, into equal amounts of members of the population, for example, dividing the distribution into segments that correspond to 5% of the population in each segment. Some embodiments may then identify as the upper and lower bounds of the ranges in the list the amounts of contribution corresponding to the edges of those segments in the histogram. In another example, the ranges may be hand coded. In some embodiments, a different distribution may be analyzed for each attribute to determine different lists of ranges of contribution of the respective attribute towards price in formation and calibration of the model by which amounts of contribution towards price of insurance are categorized into ordinal categories. In some embodiments, the ordinal categories may correspond to ordinal position of the segments of the distributions, for instance, with those users in the comparison population having a lowest contribution of a given attribute towards price of insurance being in a first ordinal position, and those users in the comparison population having a highest contribution of the given attribute towards price being in a highest ordinal position.

Some embodiments may further validate the calibrated rate factor model, as indicated by block 128. This may include validating one or both of the above-described models. In some embodiments, validation includes performing the cross validation techniques described above with reference to block 68 by which a segment of the calibration records are withheld from calibration and then used to test the calibrated model to confirm that predictions of the calibrated model correspond to known results in the withheld calibration records. Some embodiments may determine an aggregate measure of fitness or error of the models being validated based on the withheld calibration data and compare the aggregate measure of fitness or error to a threshold to determine whether to validate the model.

Some embodiments may then store the rate-factor model in memory, as indicated by block 130. In some embodiments, this may include configuring the above-described rate-factor model 34 in the insurance comparison application 12 of FIG. 1.

Figure 6:
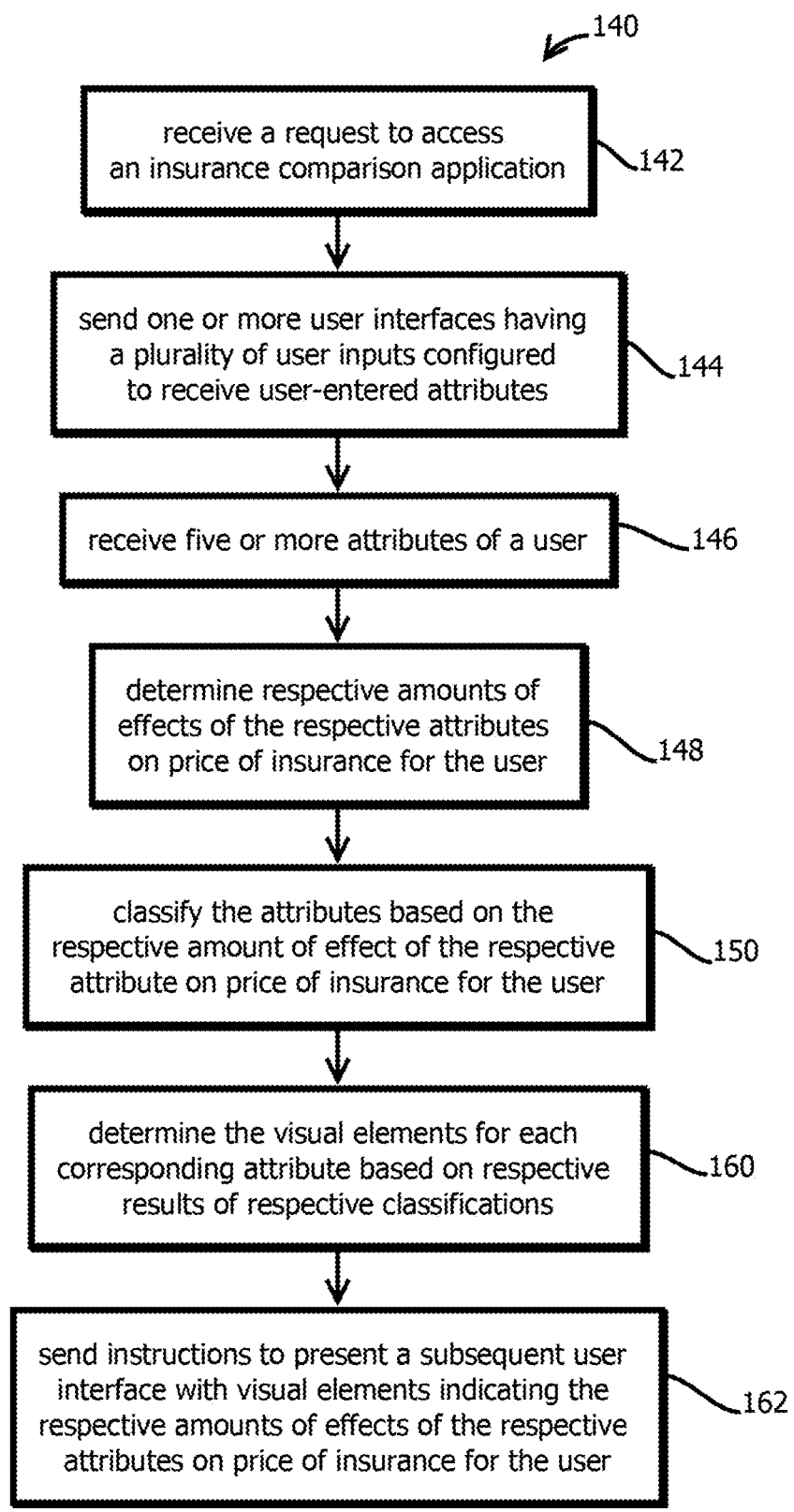
FIG. 6 is a flowchart of an example of a process to determine rate factors for a user in accordance with some embodiments of the present techniques.

In some embodiments, the calibrated rate-factor models produced by the process 120 may be used in a process 140 shown in FIG. 6 by which users are informed of the rate factors, also referred to as attributes, of the user that contribute most significantly towards the price of insurance quotes for the user. In some embodiments, the process 140 may be performed by the above-described rate-factor model 34 of FIG. 1, though embodiments are not limited to that implementation, which is not to suggest the other descriptions herein are limiting. In some embodiments, the process 140 may be performed relatively quickly upon a user submitting attributes via one of the above-described input user interfaces. For instance, in some embodiments, the process 140 (and the process 80) may be performed within 500 ms of a user submitting an attribute. In some embodiments, a relatively large number of instances of the process 140 (and the process 80) may be executed concurrently, such as more than 10, more than 100, more than 1000, or more than 10,000 instances of the process 140 concurrently executed, for instance, in a relatively large number of concurrent sessions with different user computing devices 14.

In some embodiments, the process 140 includes receiving a request to access an insurance comparison application, as indicated by block 142. In some embodiments, this may include a user navigating to a URL with their web browser and causing their web browser to request a webpage from the above-described insurance comparison application 12.

Next, some embodiments may send one or more user interfaces having a plurality of user inputs configured to receive user-entered attributes, as indicated by block 144. In some embodiments, the requests and data reception of blocks 142 and 144 respectively may correspond to the requests and the data acquisition of blocks 82 and 84 described above with reference to FIG. 3.

Next, some embodiments may receive five (or four, three, or two) or more user attributes of a user, as indicated by block 146. In some embodiments, some of the attributes may be received from some of the user inputs on some of the user interfaces and other attributes may be received from other user interfaces, for instance, those provided upon a user submitting some of the attributes. Thus, blocks 146 and 144 may be executed in an interleaved fashion in some embodiments, which is not to suggest that any of the other described blocks are limited to the sequence depicted. Some embodiments may receive seven or more attributes of a user, for instance, 10 or more attributes of the user. In some embodiments, these attributes may be the attributes described above.

Next, some embodiments may determine respective amounts of effects of the respective attributes on price of insurance for the user, as indicated by block 148. In some embodiments, this may include inputting the respective amounts into one of the models described above as being calibrated with the process of FIG. 5. In some embodiments, these models may output, for instance, a percentage of the total price attributable to the attribute. Some embodiments may output a marginal contribution of the attribute towards price, for instance, by determining a minimum price for an optimal set of attributes (or a mean set of attributes in a population) and then determining the contribution of the given attribute for an amount of price above the minimum price for the optimal (or mean) set of attributes. Thus, some embodiments may determine an amount of difference between and a measure of central tendency of price for a population, such as one of the populations described above, attributable to each attribute. For instance, some embodiments may determine that a given attribute contributes in a negative manner by one standard deviation from the respective mean for that attribute, while another attribute contributes in a positive manner by two standard deviations from the respective mean for that other attribute. Some embodiments may determine both a delta from a mean or optimal attribute value and a partial derivative for the attributes, thus indicating both sensitivity to the attribute in a local region of the parameter space for price, and a global effect relative to one of these base lines. In some cases, the rate factor for a given attribute is a weighted sum of these values. Or some embodiments may determine and report these values separately.

Some embodiments may then classify the attributes based on the respective amount of effect of the respective attribute on price of insurance for the user, as indicated by block 150. In some embodiments, this may include accessing for a given attribute one of the above-described lists of ranges, with the different ranges corresponding to ordinal classifications for the given attribute. In some embodiments, this may include selecting a list of ranges for a given attribute particular to a given geographic region, gender, age range, or other grouping in one or more of the above-describe dimensions. For instance, the attribute of age may have a plurality of different lists of ranges corresponding to different zip codes. In some embodiments, this process may be repeated for each of the attributes to identify a corresponding list of ranges pertaining to that attribute for that consumer. Some embodiments may then determine which range in the list of ranges includes the respective attribute, for instance, by iterating through the list of ranges and determining whether the attribute is less than a maximum of the range and greater than a minimum of the range until both criteria are satisfied.

In some embodiments, receiving the attributes includes receiving a value from which the attribute is calculated based upon the value supplied by a user. For instance, some embodiments may normalize values submitted by the user in the course of receiving an attribute. Similarly, some embodiments may receive the attribute by calculating a weighted sum of a plurality of values input from the user, for instance, a weighted score for driving history based on amount of tickets and amount of traffic accidents in a trailing duration of time, like the preceding two years. In some embodiments, each range of each list may be associated in memory with a visual attribute or other visual elements that is accessed below.

Some embodiments may then determine (e.g., select or calculate) visual elements for each corresponding attribute based on respective results of respective classifications, as indicated by block 160. For example, a given range may correspond to a letter grade of A+, while an adjacent range may correspond to a ordinal classification of an A, and a next ordinal range may correspond to a classification of A−, and so on. In some embodiments, the visual elements is a text label designating the ordinal classification, such as the letter grade. In some embodiments, the visual element is an icon such as a happy face or sad face, thumbs up or thumbs down sign, or zero to five stars. In some embodiments, the visual element is a visual attribute, such as a color applied to a line or other shape, for instance, with the color red indicating an ordinal classification that is relatively negative, and the color blue indicating an ordinal classification that is relatively positive.

Next, some embodiments may send instructions to present a subsequent user interface with visual elements indicating the respective amounts of effects of the respective attributes on price of insurance for the user, as indicated by block 162. In some embodiments, this may include instructing the user computing device to display the determined visual elements, for instance, sending instructions, such as data or markup or scripts, that when processed by a browser, cause the browser to render, for instance, the list of factors 114 shown in FIG. 4. In some embodiments, each visual element may be presented with, or adjacent, or otherwise in visual association with, a text label describing the attribute and indicating that the attribute has the ordinal classification signaled by the visual element determined in block 160. In some embodiments, both text and color may be modified for each visual element based upon the classification, for instance, the letter grade of a may be assigned the color blue, while the letter grade F may be assigned the color red. In some cases, the visual element is the text label with a varied visual attribute, such as color.

In some cases, it may be difficult to capture an adequate set of calibration data. To mitigate this challenge, both the insurability score and rate score may leverage the technique described with reference to FIG. 7. The technique may be used to identify trends, averages, or the impact on insurance premiums from a given variable or segment of insureds. The technique includes, in some embodiments, generating price quotes (which may include a risk score) by using a complete set of average or common consumer variables, while systematically adjusting each variable to identify the difference that it makes to the insurance premium. For example, some embodiments run a straw man (also referred to as a simulated) consumer profile as a homeowner, retrieve and store the premium, and then run the same straw man profile as a renter to identify the difference or average change that homeownership status may have on an insured. This may be run in combination with other variable changes to understand how a combined change or difference scenario may impact insurance premiums. This methodology is expected to allow systems to adjust the straw man location to understand how key factors may change down to a zip code (or more granular) level.

Figure 7:
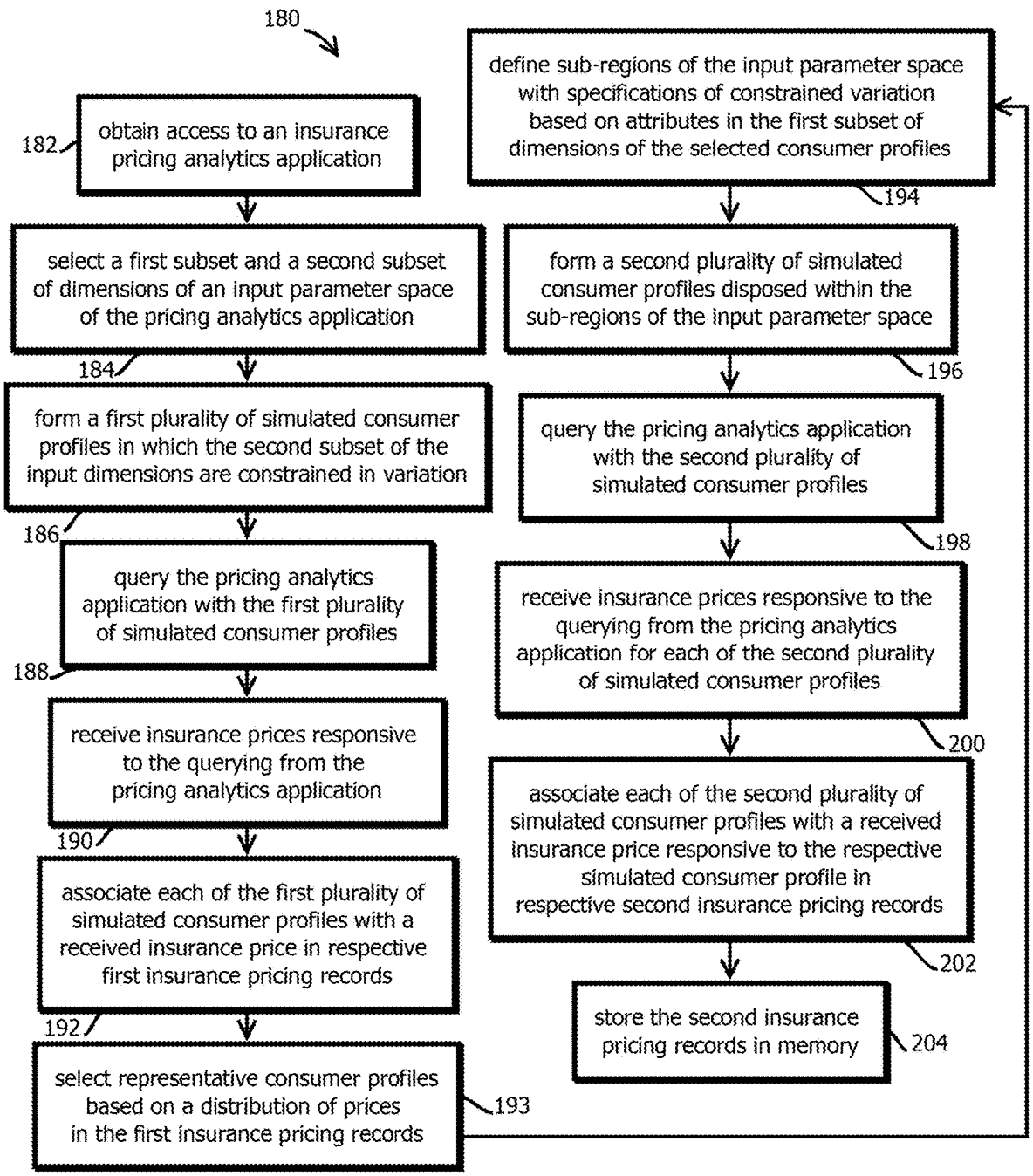
FIG. 7 is a flowchart of an example of a process by which calibration data is obtained from an insurance pricing analytics application in accordance with some embodiments of the present techniques.

Thus, in some embodiments, the above-described calibration data or a subset of the calibration data may be obtained by a process 180 shown in FIG. 7. In some embodiments, the calibration process 180 may be executed by the calibration data source 20 (e.g., by module 44), which in some cases may include a collection of distinct computers from the insurance comparison application 12 or may be integrated with the insurance comparison application 12. For example, the calibration data acquisition module 44 and the calibration data repository 48 may be integrated with the insurance comparison application 12, for instance, on a subnet as distinct services in a micro services architecture in a data center, while the insurance-pricing analytics application 42 may, for example, be installed on a distinct computing device, in some cases on the same subnet or in some cases accessed via the Internet 18, for example, in a software as a service implementation of the insurance-pricing and analytics application 42. In some embodiments, the process 180 may be executed periodically, for example, as a weekly, monthly, quarterly, or yearly batch process by which calibration data is updated.

In some embodiments, the process 180 may include obtaining access to an insurance pricing analytics application, as indicated by block 182. In some embodiments, access may be obtained by executing an instance of such an application, for instance, on a computing device in which the application is installed. In some embodiments, access may be obtained by submitting authentication credentials to a software as a service implementation of a pricing analytics application, for instance, via an application program interface exposed via the Internet.

Next, some embodiments may select a first subset and a second subset of dimensions of an input parameter space of the pricing analytics application, as indicated by block 184. In some embodiments, the pricing analytics application may be configured to receive a query specifying a user profile and respond with insurance price estimates based upon that profile, for instance, for one or several different insurance products depending upon whether an insurance product is specified in the query, and in some cases for multiple carriers. In some cases, different models may be trained on the different products or carriers, or resulting prices and risk scores may be averaged.

In some embodiments, the input parameter space may include a plurality of dimensions of the user profiles, and these dimensions may correspond to the above-described attributes of users, for instance, with one dimension for each attribute. Spaces, dimensions, attributes, parameters, matrices, vectors, and factors need not be expressly labeled with these terms in program code to constitute these items, as long as the functionality of the constructs is provided, which is not to imply that other descriptions should be read as limiting in this manner.

The parameter space may correspond to the universe of valid user profiles that may be submitted to the pricing analytics application in queries and may include, for example, each make model, and year of automobile manufactured within the last 50 years, a user's gender, a user's age, a user's zip code, a user's current insurance status, users marital status, credit rating, and the various other attributes described above. These various dimensions may combine to form a relatively high dimensional, extremely large, universe of potential user profiles that may be submitted in a query to the pricing analytics application, in some cases exceeding more than 100 million, more than 500 million, more than 1 billion, more than 100 billion, or more than 1 trillion different user profiles to which the pricing analytics application is configured to respond with a price of insurance for the corresponding user having that consumer profile. As a result, systematically evaluating every single potential consumer profile comprehensively throughout the space is prohibitive in cost, time, and computing resources in many use cases. Further, randomly sampling within this space across all dimensions can be relatively inefficient, in some cases, consuming excessive computing resources and memory to adequately characterize a response surface in terms of price of the pricing analytics application in this parameter space.

To mitigate this problem and others, some embodiments may sequentially analyze different subsets of the dimensions to intelligently select simulated consumer profiles to more efficiently characterize the response surface of insurance price produced by the pricing analytics application over the input parameter space.

The present techniques are described with reference to a first and second subset of dimensions of the input parameter space, but the techniques may be extended to additional iterations, for instance, using the second subset to than defined regions to explore in a third subset of dimensions, which may be used to define regions to explore in a fourth subset of dimensions, and so on.

In some embodiments, the first and the second subset of dimensions may collectively be the full set of dimensions of the input parameter space or a subset of dimensions of the input parameter space. In some embodiments, the first subset and the second subset may each include a plurality of dimensions of the input parameter space, for example, each including more than three, more than four, more than five, or more than 10 dimensions. In some embodiments, the first and the second subset of dimensions may be selected based upon a principal component analysis of a randomized sampling of the input parameter space, for instance, with a relatively small number of samples, such as less than 1000 or less than 10,000.

In some embodiments, the first subset and the second subset of dimensions may be selected based upon cardinality of the respective dimensions, for instance, based upon distinctions between a value like gender which has a relatively low cardinality, often two or three, compared to a value like zip code, which has a relatively high cardinality exceeding 40 thousand, corresponding to each distinct value that an attribute may take in the respective dimension.

To select the subsets of dimensions, some embodiments may estimate an amount of variation in price of insurance output by the insurance pricing application attributable to each dimension or interaction between dimensions, for example, pairwise interactions, three-way interactions, or higher order interactions. Some embodiments may then select a first dimension or interaction between dimensions that is associated with the highest variation in price of insurance. For example, some embodiments may identify a dimension or interaction therebetween that, more than other dimensions or interactions therebetween, explains variation in insurance prices. Some embodiments may then hold that dimension constant (or determine residual variation unexplained by that dimension) and analyze amounts of variation that remain unexplained by that dimension or interaction therebetween to select a next dimension or interaction between dimensions in terms of amount of remaining unexplained variation in price that is unexplained by that dimension or interaction.

Some embodiments may repeat this process to construct a ranking of dimensions or interactions between dimensions in terms of the amount by which the respective dimensions or interactions explain pricing variation remaining unexplained by higher ranked terms. Some embodiments may then assign dimensions to the first subset and the second subset based upon both this ranking and cardinality of the respective dimensions, for example, some embodiments may calculate a weighted sum of the rank and cardinality and designate values as applying to the first subset based on those values having a weighted sum that exceeds a threshold and placing the remaining values in the second subset, or vice versa.

Next, some embodiments may form a first plurality of simulated consumer profiles in which the second subset of the input dimensions are constrained in variation. In some embodiments, the first plurality of simulated consumer profiles may have values in the second subset of input dimensions that are held constant, or are limited to less than 0.5%, 1%, 5%, 10%, or 51% of a cardinality of the respective dimension in the second subset of input dimensions. For example, some embodiments may limit attributes for zip code to less than 1% of the approximately 40,000 zip codes in the United States. In some embodiments, a finite list of less than 20, less than 10, or less than five, such as a single, value of a given attribute in the second subset of input dimensions may be exclusively used for the respective dimension when constructing the first plurality of simulated consumer profiles. For example, some embodiments may form a first plurality of simulated consumer profiles that are limited to a single zip code, or a relatively short list of zip codes. In some embodiments, the first plurality of simulated consumer profiles may range between 20 and 100, between 1000 and 5000, or between 10,000 and 100,000, or more or less than any of these values, depending upon available computing resources. The first plurality of simulated consumer profiles may number substantially less than 1%, for example less than 0.1% of the number of distinct consumer profiles in the input parameter space to which the insurance pricing analytics application is responsive.

In some embodiments, in the first plurality of simulated consumer profiles, dimensions in the first subset of dimensions may be varied relatively widely compared to variation of dimensions in the second subset of dimensions. In some embodiments, values in the first subset of dimensions may vary both inside and outside of the subsequently describe sub-regions of the input parameter space defined based on analysis of prices resulting from the first plurality of simulated consumer profiles. In some embodiments, the first subset of dimensions may vary for example through each attribute value that a given dimension may take, for example, every make and model of car to which the insurance pricing analytics application is responsive with a price. In some embodiments, in the first plurality of simulated consumer profiles, the values in the first subset of input dimensions may reflect more than 10%, more than 50%, or more than 90% of a cardinality of the respective input dimensions.

Next, some embodiments may query the pricing analytics application with the first plurality of simulated consumer profiles, as indicated by block 88. In some embodiments, the queries may specify types of insurance, for example, liability or comprehensive automotive insurance and indicate various attributes of policies, like amounts of coverage, and the like. In some embodiments, the query may specify certain insurance providers.

Next, some embodiments may receive insurance prices responsive to the querying from the pricing analytics application, as indicated by block 90. In some embodiments, each query may include a single simulated consumer profile and the responsive prices may include different prices for each of a plurality of different insurance providers, or some embodiments may provide a single price for each simulated consumer profile in the query. In some embodiments, the query may include a relatively large number, such as all of the plurality of simulated consumer profiles, and corresponding prices may be received in association with each of the submitted values.

In some embodiments, some of the first plurality of simulated consumer profiles may be formed responsive to query results from other simulated consumer profiles. For example, some embodiments may implement a dynamic process of exploring the input parameter space of the pricing analytics application based upon results obtained from previous queries. Some embodiments may implement a Bayesian optimization that approximates the price (or risk score) surface produced by the pricing analytics application in the input parameter space, or some embodiments may explore the surface with, for example a Markov chain Monte Carlo exploration of the surface, e.g., optimizing for variation in price or risk. Thus, in some embodiments, some of this first plurality of simulated consumer profiles may be selected based upon prices produced responsive to some of the other members of the first plurality of simulated consumer profiles. Or in some embodiments, the first plurality of simulated consumer profiles may be constructed without regard to query results, for example, in advance of querying the pricing analytics application.

Next, some embodiments may associate each of the first plurality of simulated consumer profiles with a received insurance price (or risk score, or both) in respective first insurance pricing records, as indicated by block 192. In some embodiments, this association may include holding such associations received with query results in memory, or records may be constructed by appending and normalizing data or performing other transformations. In some embodiments, each insurance pricing record may include an insurance price (or risk score) output by the pricing analytics application and a consumer profile, such as a simulated consumer profile that was submitted to the insurance pricing analytics application to prompt the insurance pricing analytics application to output that price (or risk score).

Next, some embodiments may select representative consumer profiles based on a distribution of prices in the first insurance pricing records, as indicated by block 193. In some embodiments, this may include clustering the first insurance pricing records into a plurality of respective clusters, for example, more than five, or more than 50 clusters. In some embodiments, clusters may be formed by clustering based on, for example, a single output dimension, like price, for instance, clustering based upon density of price along a single axis. In some embodiments, clusters may be formed based upon interactions between price and various input dimensions. Some embodiments may form a vector in a parameter space of the pricing analytics application including the input dimensions and output dimension of price and cluster the vectors, one per insurance pricing record, for instance based upon DB-SCAN or other density based clustering algorithm, or embodiments may use k-means for clustering.

Some embodiments may then select one or more representative consumer profiles from each cluster, based upon insurance pricing records in that respective cluster having prices and associated consumer profiles deemed representative. Some embodiments may select a representative consumer profile based upon the price (or risk score) of the representative consumer profile being compared with a measure of central tendency of the respective cluster in terms of price (or risk score). Some embodiments may select a consumer profile in an insurance pricing record that corresponds to a mode or median price in the respective cluster. Some embodiments may determine a mean price of insurance in the respective cluster and select a representative consumer profile based upon a difference between the mean price and a price associated with the respective consumer profiles, for example, selecting a representative consumer profile that has a price that is closest to the mean. In some embodiments, a centroid of a cluster may be determined and a vector, like those described above, closest to the centroid (e.g., by cosine distance, Euclidian distance, or Minkowski distance) may be selected as corresponding to a representative insurance pricing record having a representative consumer profile.

Next, some embodiments may define sub-regions of the input parameter space with specifications of constrained variation in the first subset of dimensions based on attributes in the first subset of dimensions of the selected consumer profiles, as indicated by block 194. In some embodiments, this may include selecting sub-regions of the input parameter space in which the sub-regions have the attributes present in the representative consumer profiles in the first subset of dimensions. For example, if a single representative consumer profile is selected, and that single consumer profile has three dimensions in the first subset of dimensions of the input parameter space, for example, corresponding to a Ford F150 driven by a male, some embodiments may then define a sub-region in the input parameter space in which the input parameter space in the sub-region has this set of attributes in these dimensions. In some embodiments, the specification of constrained variation may include a list of values in the first subset of dimensions appearing in the selected representative consumer profiles (which may be characterized as partial consumer profiles). In some cases, the sub-regions may be defined by specifications that include combinations of these values, such as each permutation among the first subset of dimensions appearing within the selected representative consumer profiles, for example, all three of the attributes of a Ford F150 driven by a male. In some embodiments, there may be several sub-regions, for instance, corresponding to different consumer profiles that are selected as representative. In the sub-regions, the sub-regions may be bounded by constraints based on values of attributes in the first subset of dimensions appearing in the selected representative consumer profiles, but values of attributes in the second subset of dimensions may be unconstrained in the sub-regions. In some embodiments, the specifications of constrained variation may be a set of partial consumer profiles having specified attributes in the first subset of input dimensions selected based on (e.g., matching parts of) the representative consumer profiles.

Next, some embodiments may form a second plurality of simulated consumer profiles disposed within the sub-regions of the input parameter space, as indicated by block 196. In some embodiments, this may include varying values in the second subset of input dimensions while holding values in the first subset of dimensions constant within one or more of the above-describe partial consumer profiles. In some embodiments, the second plurality of simulated consumer profiles may include more than 1000 consumer profiles, more than 5000 consumer profiles, more than 10,000 consumer profiles, or more than 1 million consumer profiles, or more than 10 million consumer profiles, or in some cases an amount less than these thresholds. In some embodiments, in the second plurality of simulated consumer profiles, the attributes in the first subset of dimensions of the input parameter space of the pricing analytics application may vary among less than 51%, less than 10%, less than 5%, less than 1%, or less than 0.1%, of the cardinality of the respective dimension in the parameter space of the insurance pricing analytics application for consumer profiles to which the application is responsive with a price. In some embodiments, in the second plurality of simulated consumer profiles, the attributes in the second subset of dimensions of the input parameter space may vary by more than 1%, more than 50%, more than 80%, or more than 90% of the cardinality of the respective dimension in the input parameter space of the pricing analytics application. Thus, in the second plurality of simulator consumer profiles, dimensions within the second subset of dimensions may have attributes that vary substantially more relative to the respective dimension's cardinality than attributes in the first subset of dimensions, and this relationship may be reversed in the first plurality of simulated consumer profiles.

Next, some embodiments may query the pricing analytics application with the second plurality of simulated consumer profiles, as indicated by block 198. In some embodiments, this may involve the operations described above with reference to block 188.

Next, some embodiments may receive insurance prices responsive to the querying (of block 198) from the pricing analytics application for each of the second plurality of simulated consumer profiles, as indicated by block 200. In some embodiments, this may include the operations described above with reference to block 190.

Next, some embodiments may associate each of the second plurality of simulated consumer profiles with a received insurance price responsive to the respective simulated consumer profile in respective second insurance pricing records, as indicated by block 202. In some embodiments, this may include operations like those described above with reference to block 192, to form insurance pricing records having a format like those described above.

Next, some embodiments may store the second insurance pricing records in memory, as indicated by block 204. In some embodiments, these stored second insurance pricing records (or risk score records), and in some cases, the first insurance pricing records, may serve as the calibration data described above. Or calibration data may be obtained with other techniques, which is not to suggest that other descriptions are limiting.

Rate Analysis

As discussed above, consumers often struggle to develop an intuition about how their attributes affect the prices of insurance that they see. Many traditional insurance comparison applications leave consumers in the dark or provide relatively low fidelity information about how their different attributes affect the range of insurance prices that they are offered. In part, this is because it can be difficult to ascertain with traditional insurance comparison applications how a given attribute affects prices offered, as many times the algorithms by which insurance providers determine prices are not available or are not easily obtained for those operating insurance comparison applications for a plurality of different insurance providers. This is also because, even when this information is available, it can be relatively difficult to convey the information to users in a way that is intuitive and imposes a relatively low cognitive load upon the user.

Figure 9:
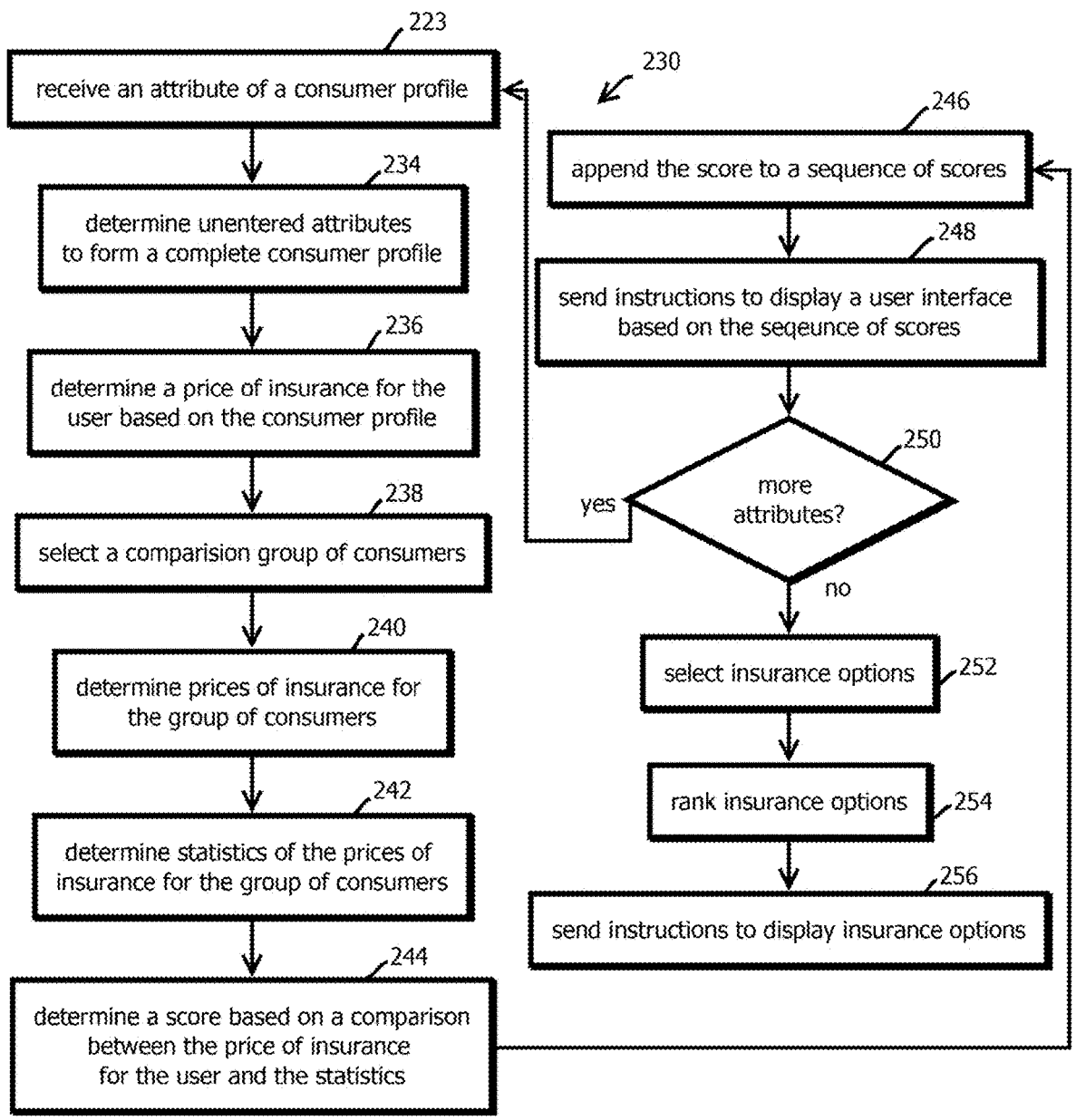
FIG. 9 is a flowchart of an example of a process to dynamically analyze marginal changes in insurance rates (e.g., prices) for a user responsive to adjustments in a user's profile in accordance with some embodiments of the present techniques.
Figure 10:
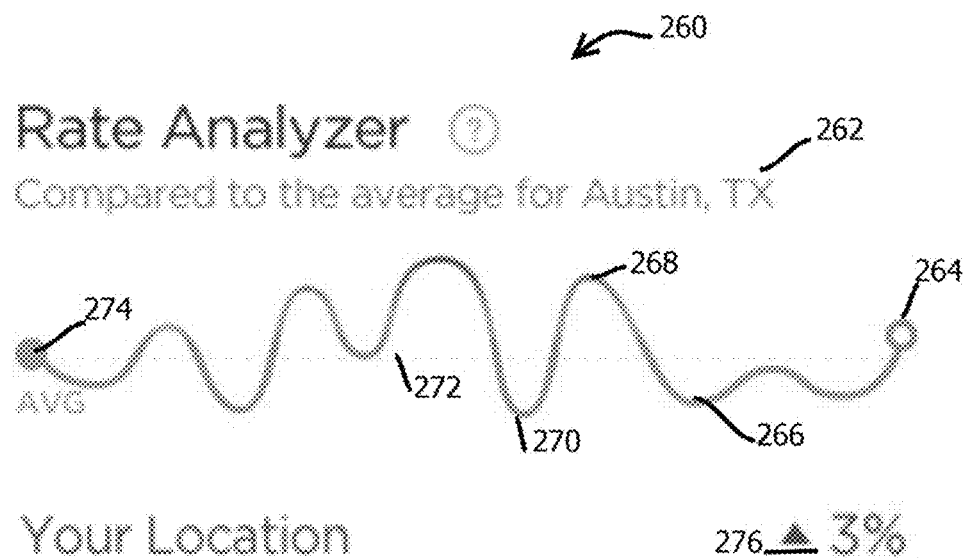
FIG. 10 is an example of a user interface by which marginal changes in expected rates during adjustment of a user profile are conveyed to a user in accordance with some embodiments of the present techniques.

FIGS. 9 through 10 depict embodiments of various techniques that may mitigate some of these problems. The figures depict techniques by which models are trained or otherwise calibrated to determine the marginal effect of a given attribute on a user's price of insurance given a set of attributes that have already been entered in a partially entered user profile, and in some cases with context provided by similar pricing for a group of consumers. These techniques further include embodiments using this model (or otherwise obtained models) to generate user interfaces, and instructing computing devices to display those user interfaces, in various embodiments.

Figure 8:
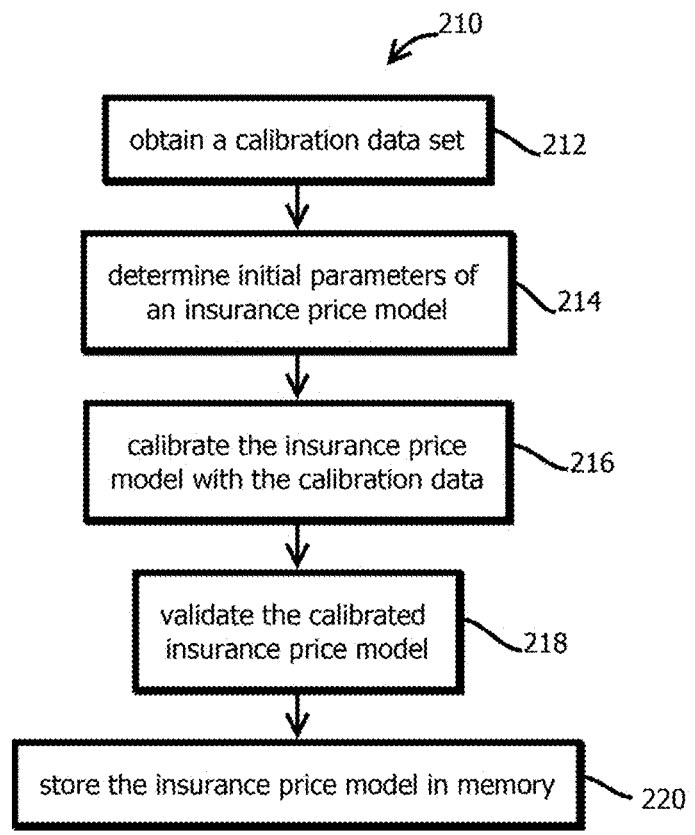
FIG. 8 is a flowchart of an example of a process to calibrate a dynamic rate-analysis model in accordance with some embodiments of the present techniques.

FIG. 8 shows an example of a process 210 to calibrate an insurance pricing model in accordance with some embodiments of the present techniques. In some embodiments, the process 210 may be performed by the above-described rate-factor model calibrator 36, with the resulting model corresponding to model 34, which may also be characterized as including an insurance price model. Though it should be emphasized that embodiments are not limited to that implementation, which is not to suggest that any other description herein is limiting. In some embodiments, the described operations of this and the other processes herein may have steps that are omitted in some embodiments, replicated in some embodiments, or additional steps may be added in some embodiments, which again is not to suggest that other descriptions are limiting. In some embodiments, the process 120 may be performed periodically, for example, daily, weekly, monthly, or yearly, to update a pricing model based upon newer calibration data.

In some embodiments, the process 210 includes obtaining a calibration data set, as indicated by block 212. In some embodiments, this may include the operations of block 122 described above with reference to FIG. 5. In some embodiments, the calibration data may include a plurality of calibration records that each pair a price or set of prices with a consumer profile to which those prices are responsive.

Next, some embodiments may determine initial parameters of an insurance pricing model, as indicated by block 214. In some embodiments, this may include the operations of block 124 described above.

Next, some embodiments may calibrate the insurance price model with the calibration data, as indicated by block 216. Again, this may include the operations described above with reference to block 126. For example, some embodiments may train a machine learning model, such as a supervised machine learning model on the calibration data, in some cases forming different candidate models based upon different initial conditions and selecting a candidate model have a highest aggregate measure of fitness or lowest aggregate measure of error.

Some embodiments may further validate the calibrated price insurance model, as indicated by block 218. In some cases, this may include the operations of blocks 128 described above. For example, some embodiments may cross validate the calibrated insurance price model with calibration data withheld from training or forming a regression.

Next, some embodiments may store the insurance price model in memory, as indicated by block 220.

Some embodiments may use the resulting insurance price model, or various other models, to execute a process 230 shown in FIG. 9 that is configured to inform users of how each attribute they enter into their consumer profile changes the price of insurance that the user sees relative to others, for example, others in their geographic area, like in their zip code. In some embodiments, the process 230 includes receiving an attribute of a consumer profile, as indicated by block 233. In some embodiments, the insurance comparison application 12 may send a user interface to the user computing devices 14 that is configured to report back each attribute to the insurance comparison application 12 as the attribute is entered by the user. Thus, attributes may be received any sequence, for example, in the sequence in which the attributes are entered, upon entry of each attribute, in some cases with some amount of delay between consecutive attributes, for example, more than one second, or more than 10 seconds, depending upon how long the user takes to enter the next value. In some embodiments, some of the attributes may be suggested to the user based upon previously entered attributes, for example, by auto completing entries or by suggesting subsequent entries to the user based upon previous entries with the user interface.

Next, some embodiments may determine which attributes in a consumer profile remain unentered and determine values for the unentered attributes to form a complete consumer profile, as indicated by block 234. In some embodiments, this may include determining default user attributes for those attributes that are not yet entered.

In some embodiments, the default user attributes may be determined based upon a measure of central tendency for each attribute for a group of users, such as a group of users in the same zip code as a user entering a consumer profile, or a group of users within some threshold distance on each of a plurality of dimensions, such as less than three or less than two dimensions of an attribute space of the consumer profiles.

In some embodiments, default attributes may be determined based upon attributes that have already been entered, for instance, based upon conditional probabilities of values for the remaining attributes. For example, a user may enter six of eight attributes, and those six attributes may make certain subsequent unentered attribute values particularly likely while others may be particularly unlikely given what is currently known about the user. Some embodiments may choose most probable values for the unentered attributes given what is known about the user through the entered attributes.

To this end or others, some embodiments may maintain a log of previously entered user profiles and calibrate a model by which un-entered attributes are inferred based upon patterns in the logged consumer profiles. For example, some embodiments may determine a most probable set of subsequent attributes given a set of entered attributes for each additionally entered attribute. In some cases, this determination may be performed in advance of a given session, e.g., for a threshold amount of attributes, or for more probable sequences of attributes.

In some embodiments, this may produce an amount of data they can be relatively large and slow to navigate, leading to slower responses that may be undesirable for users. To expedite operations, some embodiments may preform these values and store the values in a data structure configured to facilitate relatively fast retrieval of default values that are most probable given entered values for attributes. To this end, some embodiments may store the default attribute values at nodes or edges of a prefix trie, where the prefix trie may be navigated according to attribute values that are entered. For example, the prefix tree may branch at each subsequent entered attribute to a plurality of nodes corresponding to different values that the subsequent attribute may take. Some embodiments may traverse this prefix trie upon entry of each attribute, for example, down one additional branch, based on the entered value, to retrieve a set of subsequent default attribute values that have been determined to be the most probable attribute values given the new information, for instance, those corresponding to a measure of central tendency of a group of users who have the preceding set of attribute values in the log.

In some embodiments, auto complete or entry suggestions in the user interface may be populated by traversing this data structure and sending those attribute values having a relatively high conditional probability given the currently entered attribute values as suggestions to be selected by the user for the next attribute to be supplied, e.g., in user-selectable drop down boxes.

Some embodiments may determine a price of insurance for the user based on the completed consumer profile, as indicated by block 236. In some embodiments, this may include inputting the consumer profile into the model formed with the process of FIG. 8, and that model may output one or more prices, such as an average price for the top five insurance providers.

Next, some embodiments may select a comparison group of consumers, as indicated by block 238. In some embodiments, this group may be a group from which the default attributes are used to complete the consumer profile in the partially entered consumer profile in the operations of block 234. In some embodiments, the comparison group is a population of consumer profiles in the same zip code as the user or in some other unit of geographic area. In some embodiments, the comparison group is a group of consumers within a threshold distance on one or more dimensions of the parameter space of the consumer profiles, such as three or less or two or less. In some embodiments, the comparison group is a group of consumers within less than a threshold distance by cosine angle, Minkowski distance, or Euclidean distance of consumer profile vectors in this parameter space of consumer profiles.

Some embodiments may determine prices of insurance for the group of consumers, as indicated by block 240. In some embodiments, prices of insurance for the group of consumers may be performed before beginning the process 230 and stored, for example, in records associated with different zip codes, such that the prices for the group of consumers are pre-calculated for each zip codes to facilitate relatively fast retrieval in the process 230.

Some embodiments may determine statistics of the prices of insurance for the group of consumers, as indicated by block 242. In some embodiments, the statistics of the prices may be pre-calculated before beginning the process 230 and stored in association with, for example, each zip code, or other designation of group of consumers among which the selection of block 238 may be made. Some embodiments may only store the statistics and discard the individual prices when statistics are calculated, which is not to suggest that other features are not also amenable to variation.

In some embodiments, the statistics may include a measure of central tendency of the prices for the group of consumers, like a mean, mode, or median price. In some embodiments, the statistics may also include a measure of variation, such as a variance or standard deviation of these prices.

Next, some embodiments may determine a score based on a comparison between the price of insurance for the user and the statistics, as indicated by block 244. For example, some embodiments may determine a difference between a price of insurance for the consumer and a measure of central tendency of price of insurance for the group of consumers. Some embodiments may also determine a comparison between this difference and the measure of variation, for example, normalizing the difference by the measure of variation. Some embodiments may determine a number of standard deviations away from the measure of central tendency. Some embodiments may determine a percentage of consumers in the group that are below the insurance price of the consumer, percentage above the insurance price of the consumer, a percentage between the measure of central tendency and the insurance price of the consumer, or the like, and these values may serve as the scores presented in the various user interface examples below.

Some embodiments may include appending the resulting score to a sequence of scores, as indicated by block 246. In some embodiments, as each new attribute is entered, a new score may be calculated and appended to the sequence of scores, forming an ordered list of scores indicative of the above-describe differences in price, where consecutive changes in the scores are indicative of the marginal effect of a given attribute on price of insurance for the user relative to a group of users. Storing deltas between consecutive scores is within the scope of this description as well, and is also referred to by use of the term scores.

Next, some embodiments may send instructions to display the user interface based on the sequence of scores, as indicated by block 248. In some embodiments, the user interface may take the form of that described below with reference to FIG. 10. In some embodiments, sending the user interface may include rendering a graphical representation, for example, a curved line in a graph in a PNG file, server-side. Or some embodiments may send the sequence of scores to the client, and the visual elements may be determined client-side, for example, in a canvas element, to conserve bandwidth and provide lower latency access to the image, though embodiments are consistent with both arrangements, which is not suggest that other descriptions are limiting.

In some embodiments, the instructions to display the user interface include determining a position and shape of a visual elements, such as a position and shape of a line, like that described below, or other shapes, like a circle, rectangle, triangle, etc. A variety of different types of user interfaces may be provided. In some cases, the user interface may display a change in position of the visual element, for example, with a thermometer indicating a rise or lowering of temperature. In some embodiments, the user interface may display a gauge in which a needle changes angular position. In some cases, color or size of text may vary along a spectrum or gradient based on the scores.

In some embodiments, the user interface may display one or more visual elements based on the sequence of scores in a concurrent visual representation, for example, in a line graph in which one dimension corresponds to position in the sequence and another dimension corresponds to the score at that position. Dimensions in the graph may take various forms, including Cartesian coordinates and polar coordinates. Some embodiments may for three dimensional plots, e.g., in a perspective view of a surface showing how price of insurance varies according to different reference groups.

In some embodiments, the line may be smoothed to provide a more intuitive and pleasant user interface, for example, by calculating pixel positions (e.g., in display space coordinates) of the line with a spline function or various forms of Bezier curves, in some cases, anchored by midpoints between coordinates corresponding to the scores.

In some embodiments, pixel positions of the line may be determined based upon a low pass filter. For example, the sequence of scores may be modeled as a square wave, with step functions between each consecutive score, and a consistent unit of distance in a horizontal direction with each score, and some embodiments may input this square wave into a low pass filter to smooth the square wave, selecting pixel positions for the line based on the output of the filter. In some embodiments, these values for pixel positions may be determined based upon a moving average of the square wave. For example, a moving average of a proceeding three scores.

Some embodiments may then determine whether there are more attributes to be entered in the consumer profile, as indicated by block 250. Upon determining that there are more attributes to be entered, some embodiments may return to block 223. Alternatively, upon determining that there are no more attributes, or in addition, some embodiments may proceed to block 252, and select insurance options. In some embodiments, this may include querying various application program interfaces of various insurance provider servers for quotes, receiving the quotes, and ranking the quotes, as indicated by block 254, for example, based upon price, based upon affiliate compensation, based upon reputation scores, a weighted combination thereof, or the like.

Next, some embodiments may send instructions to display the insurance options in a user interface, as indicated by block 256. An example of such a user interface is described below with reference to FIG. 11. In some embodiments, the insurance options may be presented in the ranked order, for example, with user interface elements that, upon being selected by the user, cause the user computing device, for example its browser, to request content from the corresponding insurance provider server 16 described above.

In some cases, a user may navigate to the server, purchase insurance, provide payment for the insurance to the insurance provider, and receive insurance from the insurance provider. In some embodiments, the insurance provider may provide compensation to the entity operating the insurance comparison application in exchange for directing the consumer to the provider. In some embodiments, the link from the insurance comparison application may include an identifier of this entity, for example, as part of a query string of a URL of the insurance provider server. In some cases, the insurance provider server may parse this identifier from the URL upon receiving a request for content including the URL. In some cases, the insurance provider server may store this identifier in memory in association with the transaction, and determine compensation for the entity operating the insurance comparison application based upon these transactions, for example, periodically, like monthly.

FIG. 10 shows an example of a rate analyzer user interface 260 that may be formed with the process of FIG. 9. In some embodiments, the user interface 260 may include an identifier of the group of consumers, such as an identifier of a geographic area in which the consumers are residing, as indicated by element number 262.

In some embodiments, an icon 264 (like a circle, square, triangle, etc.) may represent a current price of insurance for the consumer (e.g. an estimated price given what is known and inferred in the completed consumer profile) in virtue of its position, color, or both. In some embodiments, a horizontal position (e.g., pixel position in display space) of the icon 262 may be determined based upon a number of attributes that have been entered, and a vertical position may be based upon a price of insurance for the consumer relative to prices of insurance for a group of consumers, for example based upon the comparisons described above between statistics for the group and price of insurance for the consumer. In some embodiments, the icon 264 may be depicted in the user interface as animated and moving between consecutive locations, for example, with a linear animation of movement, or by animating movement along a portion of the line that is to be displayed, e.g., revealing the line as it moves and appearing to leave the line as a trail. In some embodiments, the animated movement may have a velocity that changes non-linearly, for example, accelerating proportionately and decelerating proportionately between a starting and stopping position in display space.

In some embodiments, the icon 264 may trail a line 266 that depicts contributions of each of the attributes in the sequence of above-describe scores, produced as users enter each new attribute. In some embodiments, some attributes may produce peaks 268, while others produce valleys 270. In some embodiments, context may be provided by a reference line 272, for example, corresponding to a measure of central tendency of price of insurance for the group. In some embodiments, these visual elements may extend from an origin 274. In some embodiments, a percentage change 276 of price of insurance for the user relative to price of insurance for the group may be shown. In some embodiments, this may be a percentage of the group that sits between the measure of central tendency and the price of insurance for the user. In some embodiments, this value may be a percentage change in price of insurance relative to an amount at a previous attribute to a current attribute. In some embodiments, other visual attributes of the visual element 266 may be varied, for example, color may change based upon vertical pixel position. Similarly, the other types of user interfaces with other types of graphical representations may have similarly varying visual elements, for example, a color of a thermometer may change based upon height, a color or thickness of a gauge needle may change based upon angular position, or the like.

Thus, the user may be presented with a glanceable, low cognitive load, user interface by which they can relatively easily discern how their price of insurance is affected by different attributes that they enter.

FIG. 11 shows an example of a user interface 280 in which a plurality of insurance options 282 are presented in ranked order. In some embodiments, the user interface 280 may include three or more, four or more, five or more, or 10 or more insurance options in ranked order 282, for example, each including an identifier of an insurance provider 286, and a link 284 that upon being selected by a user, causes the user's web browser to navigate to the website of the corresponding insurance provider. In some cases, each option may include a price of insurance associated with the provider. In some embodiments, the user interface 280 may include adjacent the features depicted, one or more of the above-described user interfaces, for example, to the right. To the left side of the user interface 280, is an example of a user interface 288 by which the user may input various attributes of their consumer profile and change those attributes upon entry. In other examples, these inputs may be presented serially, e.g., one at a time to force the user to enter a particular sequence that constrains the search space for completed user profiles based on default values. Upon entry of attributes into this user interface 288, those attributes may be sent back to the insurance comparison application 12, and the insurance application comparison application 12 may send an updated user interface 280, for example, with a new ranking of insurance providers 282.

Figure 12:
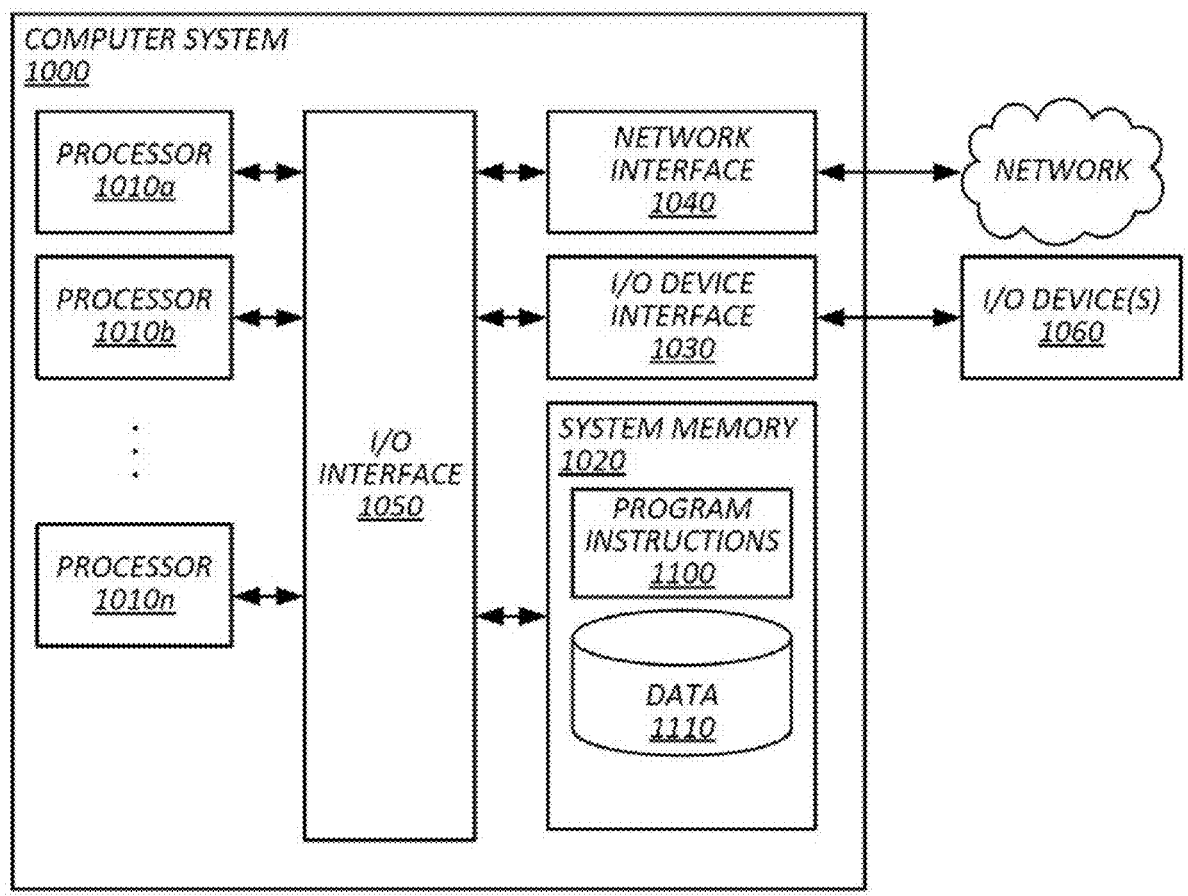
FIG. 12 is an example of a computer system by which the present techniques may be implemented.

FIG. 12 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequence, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors infer insurability scores of users by effectuating operations comprising: receiving, with a web server, from a user computing device, via a network, a request for an insurance comparison webpage; after receiving the request, sending, to the user computing device, instructions to present one or more webpages of a website having a plurality of user inputs configured to receive a plurality of attributes of the user; receiving, with a server, from the user computing device, the attributes of the user upon entry of the attributes into the user inputs of the website; determining, with one or more processors, an insurability score with an insurability model based on the received attributes of the user, the insurability model having an output dimension of insurability score and four or more input dimensions of insurance consumer attributes; and sending, with a server, to the user computing device, instructions to display a value indicative of the insurability score, wherein the insurability score is an aggregate estimate of insurance risk that consolidates the four or more input dimensions into a single output dimension.

2. The medium of embodiment 1, the operations comprising: obtaining a calibration data set having more than 10,000 calibration records, each calibration record including a respective quote for insurance and a respective set of consumer attributes upon which the respective quote is based; and calibrating the insurability model with the calibration data before receiving the request for the insurance comparison webpage.

3. The medium of embodiment 2, wherein calibrating the insurability model comprises: training a supervised machine learning model on the calibration data.

4. The medium of embodiment 3, wherein training a supervised machine learning model comprises: training a plurality of candidate supervised machine learning models on different subsets of the calibration data or with different initial model parameters; and selecting among the candidate supervised machine learning models based on an aggregate measure of fitness or error of the respective candidate machine learning models relative to at least part of the calibration data.

5. The medium of embodiment 3, the operations comprising: training the insurability model with a first subset of the calibration data; and validating the trained insurability model with a second subset of the calibration data that is different from the first subset of calibration data.

6. The medium of any one of embodiments 2-5, wherein calibrating the insurability model comprises: determining parameters of a regression of the calibration data.

7. The medium of embodiment 6, wherein forming the regression comprises: fitting a function to the calibration data, wherein the function defines a differentiable surface of insurability score in a four or higher dimensional space corresponding to the four or more input dimensions.

8. The medium of any one of embodiments 2-7, wherein obtaining the calibration data comprises: determining representative partial attribute sets of consumers, the partial attribute sets having attributes corresponding to a first subset of the four or more dimensions, the first subset having a plurality of the four or more dimensions; and querying the insurance pricing analytics application with test consumer profiles, each test consumer profiles being formed by, for each one of the partial attribute sets, systematically varying attributes in a second subset of the four or more dimensions, the second subset being disjoint from the first subset, wherein each calibration record includes attributes of a respective one of the test consumer profiles and a query response from by the insurance pricing analytics in response to the respective one of the test consumer profiles.

9. The medium of embodiment 8, wherein determining representative partial attribute sets comprises: selecting attributes in the second subset of the four or more dimensions; querying the insurance pricing analytics application with a plurality of attributes in a first subset of the four or more dimensions combined with the selected attributes in the second subset of the four or more dimensions and clustering outputs of the insurance pricing analytics into clusters; and selecting a representative partial attribute set for each of the clusters, wherein the insurance pricing analytics application is configured to output query responses for more than 100 million different permutations of test consumer profiles.

10. The medium of any one of embodiments 1-9, the operations comprising: determining a group of consumers that are within a threshold distance of the user in at least one dimension of the four or more input dimensions; and comparing the insurability score of the user to a measure of central tendency of insurability scores of the group of consumers, wherein: the value indicative of the insurability score is based on the comparison.

11. The medium of embodiment 10, wherein: determining the group of consumers comprises determining that at least some of the group of consumers are in a geographic area of the user; and comparing the insurability score comprises: determining a difference between the insurability score of the user and the measure of central tendency; and comparing the difference to a measure of variation of the insurability scores of the group of consumers.

12. The medium of any one of embodiments 1-11, the operations comprising: receiving a first attribute of the user in a first dimension of the four or more input dimensions; determining a preliminary insurability score based on the first attribute and default attributes in dimensions of the four or more dimensions other than the first dimension; and sending instructions to the user computing device to display a value indicative of the preliminary insurability score before receiving all of the plurality of attributes of the user.

13. The medium of embodiment 12, wherein sending instructions to the user computing device to display a value indicative of the preliminary insurability score comprises: sending instructions that cause a script executed by the user computing device to remove elements from a document object model of a webpage and add other elements to the document object model of the webpage without reloading an entire new webpage.

14. The medium of any one of embodiments 1-13, wherein: the insurability score is not a price, but correlates with price across a plurality of different insurance providers and a plurality of different automotive insurance policies of the respective insurance providers; the plurality of attributes and the four or more dimensions include: a value indicative of current insurance status sufficient to indicate whether a person is insured or not insured; age of a person; a value indicative of previous traffic incidents or violations of driving laws by a person; and at least two of the following: a category of vehicle use; a number of vehicles or number of drivers; a value indicative of marital status of a person; a value indicative of credit score of a person; a value indicative of whether a residence is owned by a person; a value indicative of whether a certificate of insurance is required; a value indicative of whether home insurance is also being acquired; a value indicative of whether a vehicle is owned by a person; a value indicative of annual mileage of a vehicle drive by a person; a value indicative of gender of a person; and a value indicative of an amount of education obtained by a person.

15. The medium of any one of embodiments 1-14, wherein sending instructions to display a value indicative of the insurability score comprises: determining an estimated mean insurability score for a geographic area including the user; causing the mean insurability score to be translated into a first angle in an angular display space; causing the insurability score of the user to be translated into a second angle in the angular display space; instructing the user computing device to display a first icon indicative of the mean insurability score at the first angle on an arc or circle; and instructing the user computing device to display a second icon indicative of the insurability score of the user at the second angle on the arc or circle.

16. The medium of any one of embodiments 1-15, the operations comprising: binning two or more of the plurality of attributes into two or more bins, wherein at least some attributes in different dimensions are binned into the same one of the two or more bins; wherein sending instructions to display a value indicative of the insurability score comprises instructing the user computing device to display which attributes are binned into which of the two or more bins.

17. The medium of any one of embodiments 1-16, the operations comprising: sending a plurality of insurance options to the user computing device for presentation to the user.

18. The medium of embodiment 17, wherein: each of the insurance options is associated with an address of a server of a respective insurance provider of the respective insurance option.

19. A system, comprising one or more processors and memory storing instructions that when executed effectuate operations comprising: the operations of any one of embodiments 1-18.

20. A method, comprising: the operations of any one of embodiments 1-18.

What is claimed is:

1. A tangible, non-transitory, machine readable medium storing instructions that when executed by one or more processors effectuate operations comprising:
   receiving, with the one or more processors, from a client device, a request for a user interface (UI) via a network;
   after receiving the request, sending, to the client device, instructions to present the UI, the UI comprising a set of UI elements configured to receive a plurality of attributes corresponding to a set of fields;
   receiving, with the one or more processors, the plurality of attributes entered into the set of UI elements from the client device;
   determining, with the one or more processors, a score by using a model based on the plurality of attributes provided by the client device, wherein a count of the plurality of attributes is greater than three, and wherein: the model uses the plurality of attributes as inputs, and using the model provides the score based on the plurality of attributes;
   sending, with the one or more processors, to the client device, instructions to display a value indicative of the score.

2. The medium of claim 1, wherein:
   the score is a first score;
   determining the first score comprises:
      determining the first score with the model using a first set of model parameters;
      determining a second score with the model using a second set of model parameters; and
   the operations further comprising sending instructions to display a second value indicative of the second score.

3. The medium of claim 1, wherein the score is a first score, the operations further comprising:
determining a second score by using a second model based on the plurality of attributes provided by the client device;
sending, to the client device, instructions to display a second value indicative of the second score.

4. The medium of claim 1, the operations further comprising:
determining a statistic associated with the score; and
sending, to the client device, instructions to display a second value indicative of the statistic.

5. The medium of claim 4, wherein the statistic comprises a measure of central tendency or a measure of variation.

6. The medium of claim 1, the operations further comprising accessing a repository to obtain information associated with an application program interface of an application, wherein the instructions comprise instructions to form the user interface based on the information.

7. The medium of claim 1, wherein the plurality of attributes comprises a sequence of attributes, the operations further comprising:
determining a set of default attributes by traversing a prefix tree corresponding to the sequence of attributes as far into the prefix tree as is specified by attributes entered into the UI, wherein nodes or edges of the prefix tree reached by the traversing specify the set of default attributes; and
determining a score using the model based on the sequence of attributes and the set of default attributes.

8. The medium of claim 1, wherein a count of times per day that the model is used to determine a new output is greater than a count of times per day that a set of model parameters of the model are updated.

9. The medium of claim 1, wherein sending instructions to present the UI comprises providing a set of Javascript or web assembly code to a client device, wherein the set of Javascript or web assembly code causes the client device to display a user interface element of the user interface.

10. The medium of claim 1, wherein sending instructions to display the value indicative of the score comprises:
translating the score into a cartesian coordinate system, polar coordinate system, or single dimensional coordinate system; and
displaying a shape on a screen of the client device based on the translated output.

11. The medium of claim 1, the operations further comprising:
querying an application using a first plurality of records to determine a first set of scores;
determining a second plurality of records based on the first set of scores;
querying the application with the second plurality of records to obtain a second set of scores; and
generating the model based on the first and second set of records and the first and second set of scores.

12. The medium of claim 11, wherein determining the second plurality of records comprises:
selecting a first subset of fields corresponding to a subset of attributes of the first plurality of records, wherein the attributes of the first plurality of records comprises a second subset of attributes corresponding to a second subset of fields, and wherein the first subset of fields and second subset of fields are disjoint with respect to each other;
selecting a set of attribute ranges within the first subset of fields; and
generating a record, wherein the record comprises attributes corresponding to the first subset of fields that within the set of attribute ranges.

13. The medium of claim 12, wherein:
the first subset of fields comprises a first field;
determining the second plurality of records comprises updating a second record of the second plurality of records based on a first record of the first plurality of records, wherein:
an attribute corresponding to a second field of the first record is different from an attribute corresponding to the first field of the second record, and
attributes of the first record corresponding to the first subset of fields are equal to attributes of the second record corresponding to the first subset of fields.

14. The medium of claim 11, wherein the application is a first application, the operations further comprising:
querying a second application using the first plurality of records to determine a third set of scores;
determining a third plurality of records based on the third set of scores;
querying the application with the third plurality of records to obtain a fourth set of scores; and
generating the model based on the first and third set of records and the third and fourth set of scores.

15. The medium of claim 1, the operations comprising:
obtaining a plurality of records, wherein a count of the plurality of records is greater than 10,000, and wherein each respective record of the plurality of records comprises a respective score and a respective set of attributes upon which the respective score is based; and
calibrating the model with the plurality of records before receiving the request for the UI.

16. The medium of claim 1, the operations further comprising:
determining a set of candidate model parameters;
determining a candidate output using the model based on the set of candidate model parameters and a first record, wherein the first record is associated with an objective output;
determining a difference value between the candidate output and the objective output;
determining whether the difference value satisfies a threshold; and
storing the set of candidate model parameters for use by the model in response to a determination that the difference value satisfies the threshold.

17. The medium of claim 1, the operations further comprising:
determining a first record based on the plurality of attributes;
selecting a record group based on each record of the record group being within a threshold distance in parameter space of the first record; and
comparing a measure of central tendency of a set of scores of the record group to the first record to determine a comparison metric; and
sending instructions to display a second value indicative of the comparison metric to the client device.

18. The medium of claim 1, wherein:
the model comprises a neural network;
using the model comprises using perceptron weights of the neural network; and
the operations further comprise training the neural network.

19. The medium of claim 1, the operations further comprising steps for determining the score.

20. A method comprising:
receiving, with one or more processors, from a client device, a request for a user interface (UI) via a network;
after receiving the request, sending, to the client device, instructions to present the UI, the UI comprising a set of UI elements configured to receive a plurality of attributes corresponding to a set of fields;
receiving, with the one or more processors, the plurality of attributes entered into the set of UI elements from the client device;
determining, with the one or more processors, a score by using a model based on the plurality of attributes provided by the client device, wherein a count of the plurality of attributes is greater than three, and wherein:
the model uses the plurality of attributes as inputs, and using the model provides the score based on the plurality of attributes;
sending, with the one or more processors, to the client device, instructions to display a value indicative of the score.

21. The method of claim 20, wherein:
the score is a first score;
determining the first score comprises:
determining the first score with the model using a first set of model parameters;
determining a second score with the model using a second set of model parameters; and
sending instructions to display a second value indicative of the second score.

22. The method of claim 20, wherein the score is a first score, further comprising:
determining a second score by using a second model based on the plurality of attributes provided by the client device;
sending, to the client device, instructions to display a second value indicative of the second score.

23. The method of claim 20, further comprising:
determining a statistic associated with the score; and
sending, to the client device, instructions to display a second value indicative of the statistic.

24. The method of claim 23, wherein the statistic comprises a measure of central tendency or a measure of variation.

25. The method of claim 20, further comprising accessing a repository to obtain information associated with an application program interface of an application, wherein the instructions comprise instructions to form the user interface based on the information.

26. The method of claim 20, wherein the plurality of attributes comprises a sequence of attributes, further comprising:
determining a set of default attributes by traversing a prefix tree corresponding to the sequence of attributes as far into the prefix tree as is specified by attributes entered into the UI, wherein nodes or edges of the prefix tree reached by the traversing specify the set of default attributes; and
determining a score using the model based on the sequence of attributes and the set of default attributes.

27. The method of claim 20, wherein a count of times per day that the model is used to determine a new output is greater than a count of times per day that a set of model parameters of the model are updated.

28. The method of claim 20, wherein sending instructions to present the UI comprises providing a set of Javascript or web assembly code to the client device, wherein the set of Javascript or web assembly code causes the client device to display a user interface element of the user interface.

29. The method of claim 20, wherein sending instructions to display the value indicative of the score comprises:
translating the score into a cartesian coordinate system, polar coordinate system, or single dimensional coordinate system; and
displaying a shape on a screen of the client device based on the translated output.

30. The method of claim 20, further comprising:
querying an application using a first plurality of records to determine a first set of scores;
determining a second plurality of records based on the first set of scores;
querying the applications with the second plurality of records to obtain a second set of scores; and
generating the model based on the first and second set of records and the first and second set of scores.

31. The method of claim 30, wherein determining the second plurality of records comprises:
selecting a first subset of fields corresponding to a subset of attributes of the first plurality of records, wherein the attributes of the first plurality of records comprises a second subset of attributes corresponding to a second subset of fields, and wherein the first subset of fields, and the second subset of fields are disjoint with respect to each other;
selecting a set of attribute changes within the first subset of fields; and
generating a record, wherein the record comprises attributes corresponding to the first subset of fields that within the set of attribute ranges.

32. The method of claim 31, wherein:
the first subset of fields comprises a first field;
determining the second plurality of records comprises updating a second record of the second plurality of records based on a first record of the first plurality of records, wherein:
an attribute corresponding to a second field of the first record is different from an attribute corresponding to the first field of the second record, and
attributes of the first record corresponding to the first subset of fields are equal to attributes of the second record corresponding to the first subset of fields.

33. The method of claim 30, wherein the application is a first application is a first application, further comprising:
querying a second application using the first plurality of records to determine a third set of scores;
determining a third plurality of records based on the third set of scores;
querying the application with the third plurality of records to obtain a fourth set of scores; and
generating the model based on the first and third set of records and the third and fourth set of records.

34. The method of 20, further comprising:
obtaining a plurality of records, wherein a count of the plurality of records is greater than 10,000 and wherein each respective record of the plurality of records comprises a respective score and a respective set of attributes upon which the respective score is based; and
calibrating the model with the plurality of records before receiving the request for the UI.

35. The method of claim 20, further comprising:
determining a set of candidate model parameters;

determining a candidate output using the model based on the set of candidate model parameters and a first record, wherein the first record is associated with an objective output;

determining a difference value between the candidate output and the objective output;

determining whether the difference value satisfies a threshold; and storing the set of candidate model parameters for sue by the model in response to a determination that the difference value satisfies the threshold.

36. The method of claim 20, further comprising:

determining a first record based on the plurality of attributes;

selecting a record group based on each record of the record group being within a threshold distance in parameter space of the first record; and comparing a measure of central tendency of a set of scores of the record group to the first record to determine a comparison metric; and sending instructions to display a second value indicative of the comparison metric to the client device.

37. The method of claim 20, wherein the model comprises a neural network and using the model comprises using perceptron weights of the neural network, further comprising training the neural network.

38. The method of claim 20, further comprising steps for determining the score.

\* \* \* \* \*